(12) United States Patent
Lorenz et al.

(10) Patent No.: US 7,313,552 B2
(45) Date of Patent: Dec. 25, 2007

(54) BOOLEAN NETWORK RULE ENGINE

(75) Inventors: Brian K. Lorenz, Denver, CO (US); Jihong Jin, Highlands Ranch, CO (US)

(73) Assignee: Sybase, Inc., Dublin, CA (US)

( * ) Notice: Subject to any disclaimer, the term of this patent is extended or adjusted under 35 U.S.C. 154(b) by 291 days.

(21) Appl. No.: 10/710,885

(22) Filed: Aug. 10, 2004

(65) Prior Publication Data

US 2005/0246302 A1  Nov. 3, 2005

Related U.S. Application Data

(60) Provisional application No. 60/521,256, filed on Mar. 19, 2004.

(51) Int. Cl.
- *G06F 17/00* (2006.01)
- *G06N 5/00* (2006.01)
- *G06N 5/02* (2006.01)

(52) U.S. Cl. .............................. 706/47; 706/45; 706/46

(58) Field of Classification Search ................... 706/2, 706/47, 48, 25, 900
See application file for complete search history.

(56) References Cited

U.S. PATENT DOCUMENTS

| | | | | |
|---|---|---|---|---|
| 3,846,745 A | * | 11/1974 | Hill et al. ................... | 367/122 |
| 4,048,483 A | * | 9/1977 | Keats ......................... | 714/797 |
| 4,475,159 A | * | 10/1984 | Gerstenmaier et al. ....... | 701/79 |
| 4,583,169 A | | 4/1986 | Cooledge ..................... | 700/86 |
| 4,799,254 A | | 1/1989 | Dayton et al. | |
| 4,916,627 A | | 4/1990 | Hathaway ..................... | 716/6 |
| 5,247,634 A | | 9/1993 | Cline et al. ................. | 707/205 |
| 5,276,776 A | | 1/1994 | Grady et al. | |
| 5,291,399 A | | 3/1994 | Chaco | |
| 5,467,268 A | | 11/1995 | Sisley et al. .................... | 705/9 |
| 5,467,343 A | | 11/1995 | Lee et al. ................... | 370/351 |
| 5,524,082 A | | 6/1996 | Horstmann et al. ............ | 716/2 |
| 5,574,911 A | | 11/1996 | D'Angelo et al. ............. | 707/1 |
| 5,623,492 A | | 4/1997 | Teraslinna .................. | 370/397 |
| 5,664,228 A | | 9/1997 | Mital | |
| 5,671,361 A | | 9/1997 | Brown et al. .................. | 705/9 |

(Continued)

OTHER PUBLICATIONS

Andrew S. Tanenbaum, Structured Computer Organization 2nd ed., 1984, pp. 10-12.*

(Continued)

*Primary Examiner*—Anthony Knight
*Assistant Examiner*—Adrian L. Kennedy
(74) *Attorney, Agent, or Firm*—John A. Smart; G. Mack Riddle

(57) ABSTRACT

A Boolean Network rule engine for evaluation of rules is described that comprises: a rules interface for receiving a set of rules, each rule having at least one condition; a network builder for building a Boolean Network representation of the set of rules including transducers linked by logic gates, each transducer generating a Boolean value based on evaluating an item of input data against a condition of a rule; and a runtime evaluation engine for receiving input data, detecting changed items of input data, activating links among transducers and logic gates of the Boolean Network representation based on the changed items of input data so as to utilize transducers and logic gates of the Boolean Network representation relevant to rule evaluation outcome, evaluating rules based on the input data and active transducers and logic gates and returning results of rule evaluation.

37 Claims, 24 Drawing Sheets

U.S. PATENT DOCUMENTS

| | | | |
|---|---|---|---|
| 5,671,404 A | 9/1997 | Lizee et al. | |
| 5,684,994 A | 11/1997 | Tanaka et al. | 717/153 |
| 5,708,798 A | 1/1998 | Lynch et al. | 703/1 |
| 5,742,772 A | 4/1998 | Sreenan | 709/226 |
| 5,794,178 A | 8/1998 | Caid et al. | 704/9 |
| 5,966,126 A * | 10/1999 | Szabo | 715/762 |
| 6,205,315 B1 * | 3/2001 | Montfort et al. | 399/319 |
| 6,212,668 B1 | 4/2001 | Tse et al. | 716/7 |
| 6,326,962 B1 * | 12/2001 | Szabo | 715/762 |
| 6,363,289 B1 * | 3/2002 | Keeler et al. | 700/48 |
| 6,397,370 B1 | 5/2002 | Fernandez et al. | 716/2 |
| 6,442,584 B1 | 8/2002 | Kolli et al. | 718/104 |
| 6,470,482 B1 * | 10/2002 | Rostoker et al. | 716/6 |
| 6,480,814 B1 | 11/2002 | Levitan | 703/2 |
| 6,535,864 B1 * | 3/2003 | Zahn | 706/47 |
| 6,882,181 B1 * | 4/2005 | Peller | 326/93 |
| 6,910,033 B2 | 6/2005 | Rosenblum | 707/3 |
| 6,993,731 B2 * | 1/2006 | Whitaker et al. | 716/3 |
| 7,065,745 B2 * | 6/2006 | Chan | 717/117 |
| 2003/0126579 A1 * | 7/2003 | Whitaker et al. | 716/18 |
| 2004/0030421 A1 * | 2/2004 | Haley | 700/49 |
| 2004/0068697 A1 * | 4/2004 | Harik et al. | 715/513 |
| 2004/0117765 A1 * | 6/2004 | Chan | 717/117 |

OTHER PUBLICATIONS

Java Specification Requests, http://jcp.org/en/jsr/detail?id=94, 2000.*
Hirtle, D. et al, Schema Specification of RuleML 0.86, RuleML.org, Jun. 23, 2004.
W3C, Document Object Model (DOM) Level 3 Core Specification, World Wide Web Consortium (W3C), www.w3.org/DOM, Apr. 7, 2004.
W3C, RDF Primer, W3C Recommendation, Feb. 10, 2004.
Sun Microsystems, Java 2 Platform Enterprise Edition Specification, v. 1.4, Final Release, Sun Microsystems, Inc., Mountain View, CA, Nov. 24, 2003.
Java Community Process, Java Rule Engine API JSR-94, Version 1.0, Java Community Process, Sep. 15, 2003.
W3C, Extensible Markup Language (XML) 1.0 specification, W3C.org, Oct. 6, 2000.
Gosling, J. et al., The Java Language Environment: A White Paper, Sun Microsystems Computer Company, Oct. 1995.
Forgy, C. L., Rate: A Fast Algorithm for the Many Pattern/Many Object Pattern Match Problem, Artificial Intelligence, 19 (1982) pp. 17-37.

* cited by examiner

LINK XY'S SOURCE NODE IS X.

LINK XY'S DESTINATION NODE IS Y.

NODE A HAS AN INPUT COUNT OF THREE AND AN OUTPUT COUNT OF TWO. NODE A HAS THREE INPUT LINKS AND TWO OUTPUT LINKS.

LINK AB HAS A SOURCEOUTPUTCOUNT OF TWO.

HIGH LEVEL VIEW OF DEPLOYMENT ENVIRONMENT
SYSTEM COMPONENTS

NETWORK BUILDER
DETAILED VIEW

INITIAL NETWORK STATE. ALL TRANSDUCER OUTPUTS ARE FALSE OR UNKNOWN.

AN INPUT ARRIVES WITH A = 1, B = 1, C = 1. NODES 1121, 1122, AND 1123 HIT.

AN INPUT ARRIVES WITH C = 0, D = 0.

BOOLEAN NETWORK RULE ENGINE

CROSS REFERENCE TO RELATED APPLICATIONS

The present application is related to and claims the benefit of priority of the following commonly-owned, now abandoned provisional application(s): application Ser. No. 60/521,256, filed Mar. 19, 2004, entitled "Boolean Network Rule Engine", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Aug. 6, 2004, 5:25 pm, size: 37.2 KB; Object ID: File No. 1; Object Contents: Source Code.

BACKGROUND OF INVENTION

1. Field of the Invention

The present invention relates generally to data processing environments and, more particularly, to a Boolean network rule engine providing improved analysis and processing of business data and rules.

2. Description of the Background Art

Business applications often analyze changes in business data in order to suggest (or determine) a course of action. During the analysis process, the business application typically evaluates a large number of logical expressions or rules. Frequently, these rules are defined by entities (e.g., entities such as people or computer programs) that are not aware of each other. Rules defined in this manner are likely to be numerous, redundant, and ad hoc in nature. Accordingly, naively evaluating these rules one by one can have prohibitive performance costs on the application performing the analysis.

Applications that analyze changes in business data frequently employ a rule engine (or inference engine) component for evaluating logical expressions or rules. A rule engine may be viewed as a sophisticated conditional statement (or "if/then" statement) interpreter. The if/then (or conditional) statements that are interpreted are called rules. The "if" portions of rules contain conditions such as "shoppingCart.total/Amount>$100". The "then" portions of rules contain actions that occur based on evaluation of the condition, such as "recommendDiscount(5%)". The inputs to a rule engine are a ruleset and some data objects. The outputs from a rule engine are determined by the inputs and may include the original input data objects with possible modifications, new data objects, and/or side effects such as instructing the application to send a mail message saying "Thank you for shopping."

The expert systems branch of computer science has traditionally used the Rete algorithm ("Rete") to impose order on large collections of rules and to evaluate them efficiently. For further description of the Rete algorithm, see e.g., Forgy, C. L., "Rete: A Fast Algorithm for the Many Pattern/Many Object Pattern Match Problem", Artificial Intelligence, 19 (1982) pp. 17-37, the disclosure of which is hereby incorporated by reference. See also, U.S. Pat. No. 5,276,776 issued to Grady et al., titled "System and method for building a computer-based Rete pattern matching network", the disclosure of which is hereby incorporated by reference. A salient feature of the Rete methodology is that it operates directly on the parts of a rule rather than on the rule in its entirety. Rete exploits the fact that rules often share common subexpressions. Rete evaluates these common subexpressions only once and then shares the result. A Rete network (system) remembers the values of subexpressions as it computes them, so it leverages the fact that large data sets tend to change in small increments rather than all at once. Subsequent rule evaluations involve only those subexpressions which have changed.

The Rete was originally designed to improve the speed of forward-chained rule systems by limiting the effort required to recompute the conflict set after a rule is fired. The Rete takes advantage of two empirical observations: "temporal redundancy" and "structural similarity". Temporal redundancy occurs because the firing of a rule usually changes only a few facts, and only a few rules are affected by each of those changes. Structural similarity exists because the same pattern often appears in the left-hand side of more than one rule. Facts are variable-free tuples, patterns are tuples with some variables, and rules have as left-hand sides lists of patterns.

The Rete algorithm uses a rooted acyclic directed graph, referred to as the Rete or Rete network, where the nodes, with the exception of the root, represent patterns; and paths from the root to the leaves represent the left-hand sides of rules. At each node is stored information about the facts satisfied by the patterns of the nodes in the paths from the root up to and including this node. This information is a relation representing the possible values of the variables occurring in the patterns in the path.

The Rete methodology provides for keeping up to date the information associated with the nodes in the graph. When a fact is added or removed from working memory, a token representing that fact and operation is entered at the root of the graph and propagated to its leaves modifying, as appropriate, the information associated with the nodes. When a fact is modified, for example, the height of David is changed from 6 feet to 6 feet, 2 inches, this is expressed as a deletion of the old fact (the height of David is 6 feet) and the addition of a new fact (the height of David is 6 feet, 2 inches).

The Rete graph includes the root node, one-input "pattern nodes", and two-input "join nodes". The root node has as successors one-input "kind" nodes, one for each possible kind of fact (the kind of a fact is its first component). In other words, root nodes represent the entry points for objects to be tested. Root nodes then broadcast the objects to the successor nodes in the network based on their object type. When a token arrives at the root, a copy of that token is sent to each "kind" node where a "SELECT" operation is carried out that selects only the tokens of its kind. Then, for each rule and each of its patterns, a one input alpha node is created. Each "kind" node is connected to all the alpha nodes of its kind and delivers to them copies of the tokens it receives. To each alpha node is associated a relation, the "alpha memory", whose columns are named by the variables appearing in the node's pattern. For example, if the pattern for the node is (is-a-parent-of ?x ?y) then the relation has columns named "X" and "Y". When a token arrives at the alpha node a "project" operation extracts from the token tuples the components that match the variables of the pattern. The resulting tuple is added to the alpha memory of the node. For each rule Ri, if $A_{i,1}$ $A_{i,2}$ ... $A_{i,n}$ are in order with the alpha nodes of the rule, then two-input nodes are constructed, called "beta nodes", $B_{i,2}$ $B_{i,3}$ ... $B_{i,n}$, where:

$B_{i,2}$ has its left input from $A_{i,1}$ and its right input from $A_{i,2}$, $B_{i,j}$, for j greater than 2, has its left input from $B_{i,j-1}$ and its right input from $A_{i,j}$ At each beta node $B_{i,j}$ a relation is stored, the "beta memory", which is the "join" of the relations associated to its left and right input, joined on the columns named by variables that occur in both relations. For example if the left input relations and right input relations are as follows:

TABLE

| X | Y |
|---|---|
| ann | 4 |
| sam | 22 |

TABLE

| X | Z |
|---|---|
| ann | tom |
| sam | sue |
| tom | jane | then the resulting beta memory relation is

TABLE

| X | Y | Z |
|---|---|---|
| ann | 4 | tom |
| ann | 4 | sue |

Finally, the last beta node of each rule is connected to a new alpha node where a "project" operation takes place to select all and only the variables that occur on the right-hand side of the rule.

The Rete methodology described above alleviates much of the inefficiency in evaluation of rules by remembering past test results across iterations of the rule loop. Only new facts are tested against any "if" conditions of rules and the same rules are not tested repeatedly. As a result, the Rete methodology is widely used for reducing the computational complexity and inefficiency that would result from the naive evaluation of rules, particularly in situations involving the evaluation of a large number of rules.

Although the Rete is widely used and is good at handling evaluation of large numbers of rules, it is less efficient when it is called upon to handle large amounts of data and/or rapidly changing data. Another limitation of the traditional Rete is that it does not provide support for use of the OR operator. As rules are often written using the OR operator, it is desirable to provide direct support for this operator.

What is needed is an improved solution that provides better performance in the evaluation of rules (i.e., improved system responsiveness), particularly in environments involving large amounts of data and/or rapidly changing data. Ideally the solution should also support the use of the OR operator. The present invention provides a solution for these and other needs.

SUMMARY OF INVENTION

A Boolean Network rule engine is described. In one embodiment, for example, a system of the present invention for evaluation of a set of rules based on input data is described that comprises: a rules interface for receiving a set of rules, each rule having at least one condition; a network builder for building a Boolean Network representation of the set of rules, the Boolean Network representation including transducers linked by logic gates, each transducer generating a Boolean value based on evaluating an item of input data against a condition of a rule; and a runtime evaluation engine for receiving input data, detecting changed items of input data, activating links among transducers and logic gates of the Boolean Network representation based on the changed items of input data so as to utilize transducers and logic gates of the Boolean Network representation relevant to rule evaluation outcome, and evaluating rules based on the input data and active transducers and logic gates of the Boolean Network representation.

In another embodiment, for example, a method of the present invention is described for evaluating a set of rules based on input data, the method comprises steps of: receiving a set of rules, each rule having at least one condition; building a Boolean Network representation of the set of rules, the Boolean Network representation including transducers linked by logic gates with each transducer generating a Boolean value based on evaluating an item of input data against a condition of a rule; detecting changed items of input data; in response to changed items of input data, activating links among transducers and logic gates of the Boolean Network representation so as to utilize transducers and logic gates of the Boolean Network representation relevant to rule evaluation outcome; and determining results of the set of rules based on the input data using active transducers and logic gates of the Boolean Network representation.

DETAILED DESCRIPTION

Glossary

Figure 1:
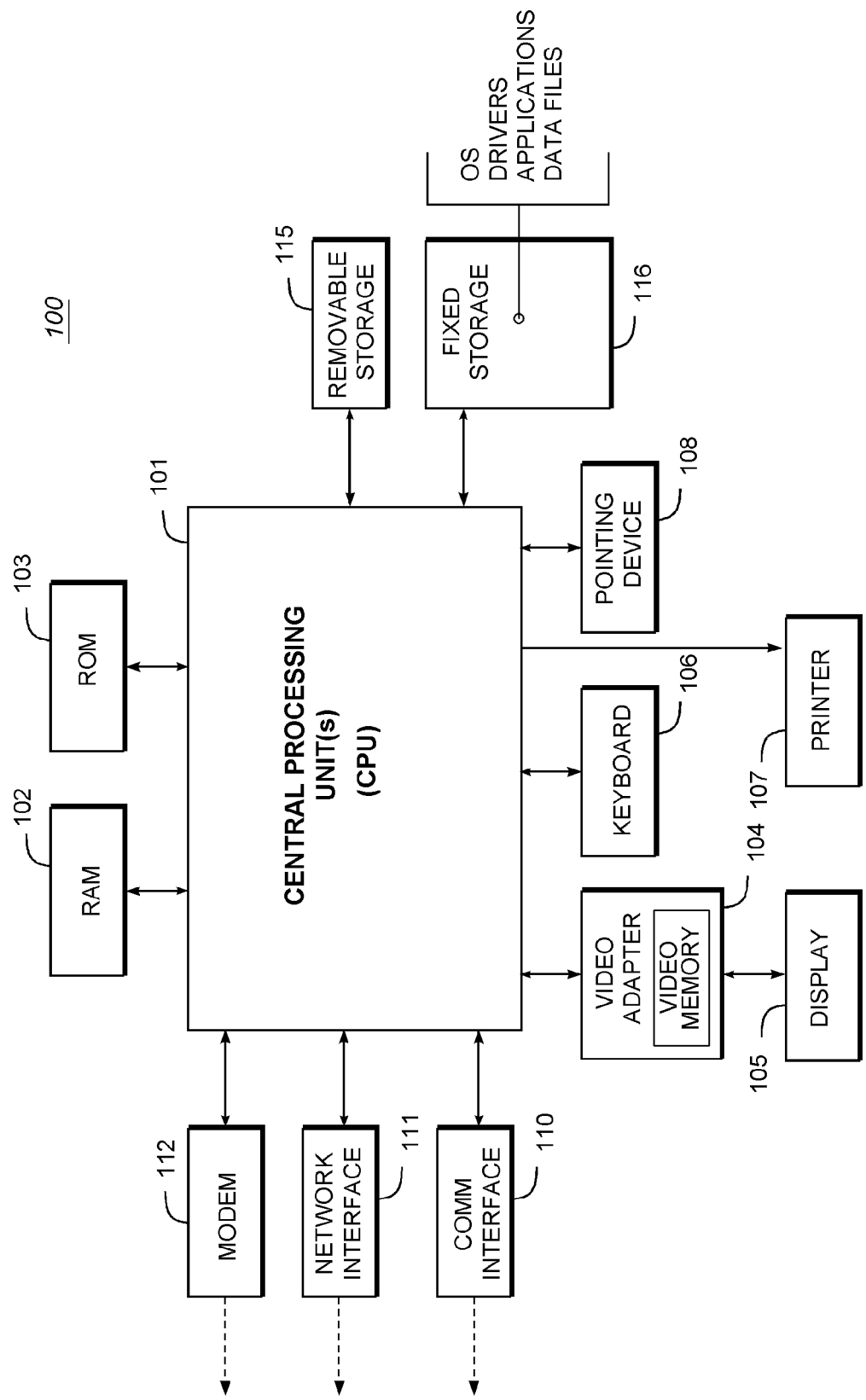
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows:

Bytecode: A virtual machine executes virtual machine low-level code instructions called bytecodes. Both the Sun Microsystems Java virtual machine and the Microsoft NET virtual machine provide a compiler to transform the respective source program (i.e., a Java program or a C# program, respectively) into virtual machine bytecodes.

Document Object Model or DOM: The Document Object Model (DOM) is a platform- and language-neutral interface that allows programs and scripts to dynamically access and update the content, structure and style of documents. The document can be further processed and the results of that processing can be incorporated back into the presented page. For further information regarding the Document Object Model, see e.g., "Document Object Model (DOM) Activity Statement" available from the World Wide Web consortium (W3C), the disclosure of which is hereby incorporated by reference. A copy of this document is available via the Internet (e.g., currently at www.w3.org/DOM).

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

J2EE: "J2EE" is an abbreviation for Java 2 Platform, Enterprise Edition, which is a platform-independent, Java-centric environment from Sun Microsystems for developing, building, and deploying Web-based enterprise applications. The J2EE platform consists of a set of services, APIs, and protocols that provide functionality for developing multi-tiered, Web-based applications. For further information on J2EE, see e.g., "Java 2 Platform, Enterprise Edition Specification, version 1.4", from Sun Microsystems, Inc., the disclosure of which is hereby incorporated by reference. A copy of this specification is available via the Internet (e.g., currently at java.sun.com/j2ee/docs.html).

JSR 94: JSR 94 is a Java runtime API for rule engines which prescribes a set of fundamental rule engine operations. A primary input to a rule engine is a collection of rules called a ruleset. The rules in a ruleset are expressed in a rule language. The JSR 94 specification defines generic API support for parsing rulesets, but does not define a rule language standard. The JSR 94 specification addresses the community's need to reduce the cost associated with incorporating business logic within applications, and reduce the cost associated with implementing platform-level business logic tools and services. For additional information see, "JSR 94: Java Rule Engine API", available from The Java Community Process Program, the disclosure of which is incorporated by reference. A copy of this document is available via the Internet (e.g., currently at jcp.org/about-java/communityprocess/first/jsr094/index.html).

RDF: The Resource Description Framework (RDF) integrates a variety of applications from library catalogs and worldwide directories to syndication and aggregation of news, software, and content to personal collections of music, photos, and events using XML as an interchange syntax. The RDF specifications provide a lightweight ontology system to support the exchange of knowledge on the Web. For further information on RDF, see e.g., "Research Description Framework", the disclosure of which is hereby incorporated by reference. A copy of this specification is available via the Internet (e.g., currently at www.w3.org/RDF).

RuleML: RuleML is a proposed canonical Web language for rules. RuleML covers the entire rule spectrum, from derivation rules to transformation rules to reaction rules. RuleML can thus specify queries and inferences in Web ontologies, mappings between Web ontologies, and dynamic Web behaviors of workflows, services, and agents. RuleML encompasses a hierarchy of rules, including reaction rules (event-condition-action rules), transformation rules (functional-equational rules), derivation rules (implicational-inference rules), and is also specialized to facts ("premiseless" derivation rules) and queries ("conclusionless" derivation rules), as well as integrity-constraints (consistency-maintenance rules). The current version of the RuleML schema specification is version 0.86. For further information regarding RuleML, see e.g., "Schema Specification of RuleML 0.86", which is available from The RuleML Initiative, the disclosure of which is hereby incorporated by reference. This specification is available via the Internet (e.g., currently at www.ruleml.org/0.86/).

URI: A Uniform Resource Identifier or URI is a compact string for identifying either an abstract or a physical resource. A URI is an abstract superclass of Uniform Resource Names (URNs) and Uniform Resource Locators (URLs), which actually exist.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
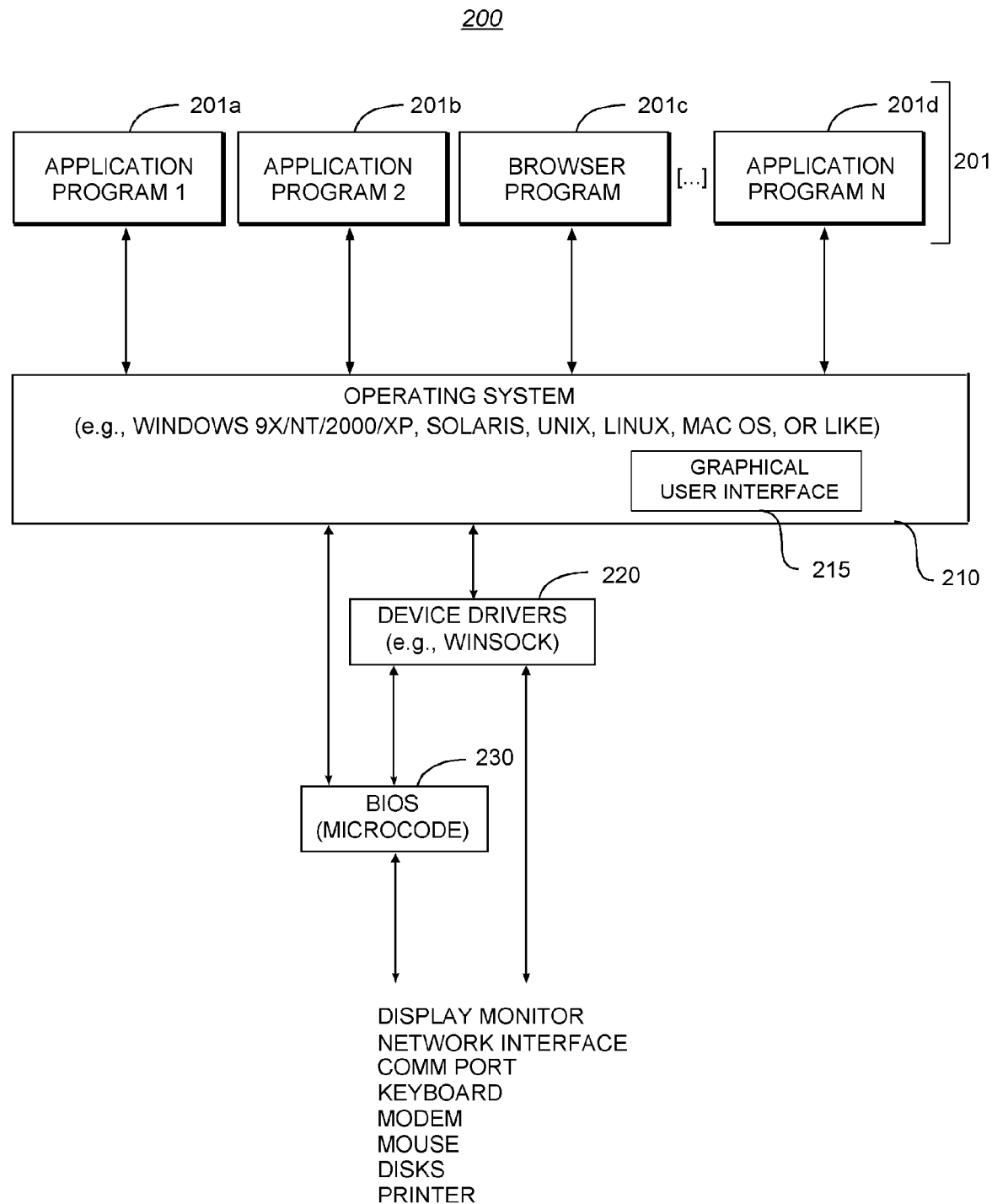
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

Anatomy of a Boolean Network

The system of the present invention comprises a rule engine which is referred to herein as a "Boolean Network" rule engine. The Boolean Network rule engine of the present invention is currently embodied as a software component of a business process engine application. The Boolean Network rule engine encapsulates the decision-making logic of a stateful event driven application, using an improved methodology to optimize the evaluation of large groups of tightly coupled rules.

Figure 3A:
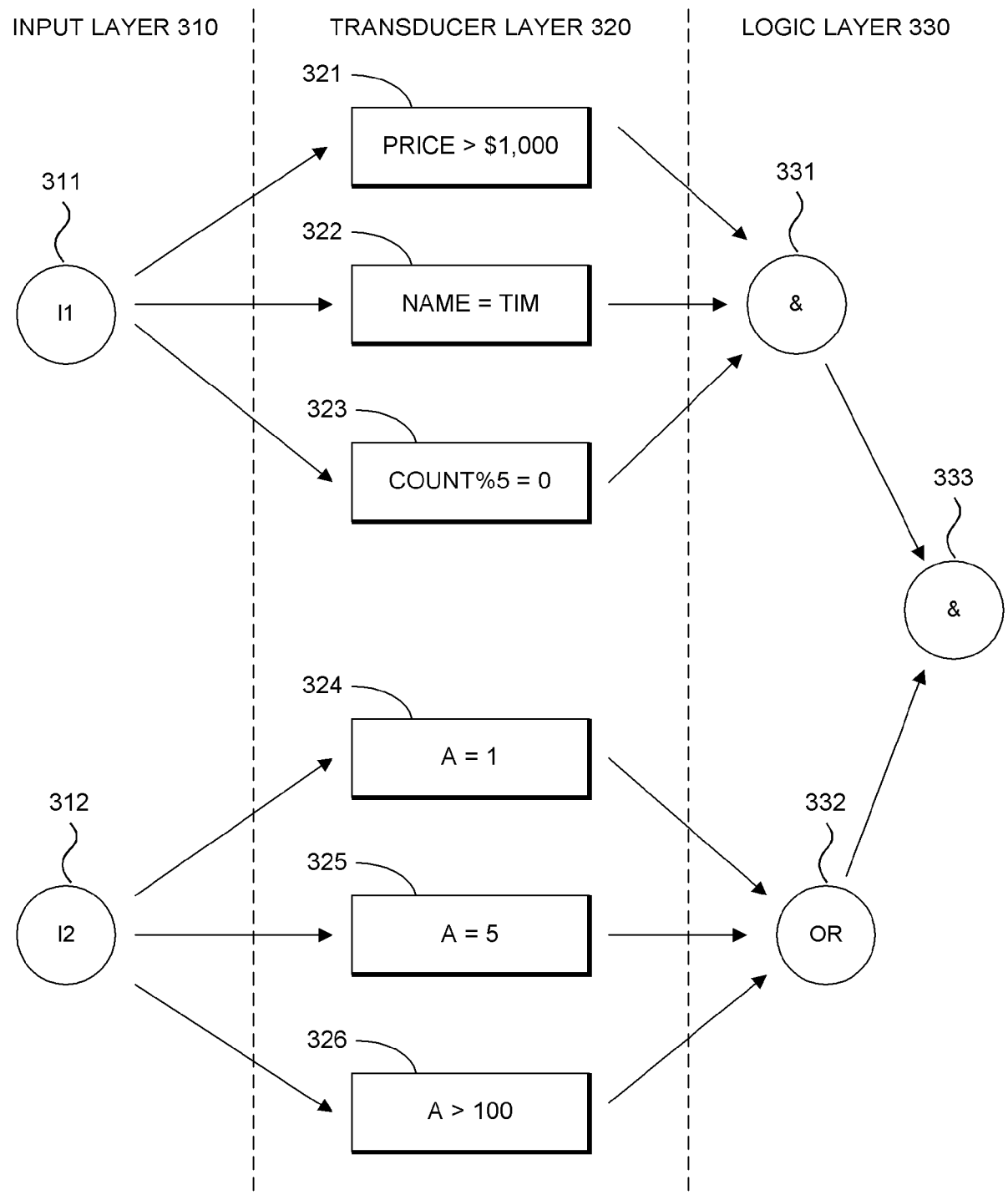
FIG. 3A is a general block diagram of a Boolean Network constructed in accordance with the teachings of the present invention.

A Boolean network constructed in accordance with the methodology of the present invention (hereinafter referred to as a "Boolean Network") comprises a directed acyclic graph composed of input, transducer, and Boolean operator nodes. FIG. 3A is a general block diagram of a Boolean Network 300 constructed in accordance with the teachings of the present invention. As shown, the Boolean Network 300 includes an input layer 310, a transducer layer 320, and a logic layer 330. As shown, the input layer 310 includes input nodes 311, 312, while the transducer layer 320 includes transducers 321-326. The logic layer 330 includes Boolean operator nodes 331, 332, 333. Information propagates through the Boolean Network from left to right. An input node (e.g., input nodes 311, 312) is typically associated with an application object. The application object is a source of business data to which rules may be applied. An input node may be associated with a database table, a Document Object Model (DOM) document, an Enterprise JavaBeans (EJB) object, or any other object which provides data. The Boolean Network is said to be an observer of its input nodes. The mechanism by which an input node informs the Boolean Network of its changed state is described later in this document. Input nodes can be coarse or fine grained. The finest grained input would be associated with a single atomic value. A coarse grained input might contain many atomic values.

In many electronic devices a transducer converts some sort of environmental condition (e.g., temperature or light intensity) into a signal that a digital circuit understands. In a Boolean Network, as shown at FIG. 3A, a transducer node converts business data into Boolean values which the Boolean Network understands. For example, the transducer 321 illustrated at FIG. 3A may determine if the price of an item is greater than $1,000. Note that some transducers may be bound to an expensive component invocation (e.g., a database call or DOM lookup). The present invention provides for passivation of transducers to avoid expensive component invocations that are not necessary for determining results of rule evaluation. The manner in which the Boolean Network passivates transducers in order to avoid expensive component invocations is described below in this document.

The logic layer 330 of the Boolean Network 300 supports "AND" and "OR" operators as illustrated at FIG. 3A. The inputs to a Boolean operator node may come from transducers and/or other operator nodes. The Boolean operator node's sensitivity to changes in its inputs is dependent on the network state. The output from a Boolean operator node is the result of the Boolean operation it represents.

Decision nodes are nodes that the application uses to drive decisions. Decision nodes may be either transducer or Boolean operator nodes. The Boolean Network is a computational structure for efficiently evaluating rules in a ruleset. There is a one to one relationship between rules in the ruleset and decision nodes in the Boolean Network.

Links

Figure 3B:
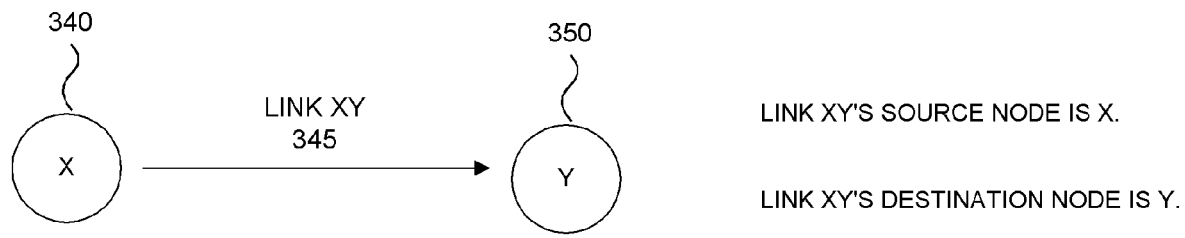
FIG. 3B is a general block diagram illustrating the linking of nodes in a Boolean Network.
Figure 3B:
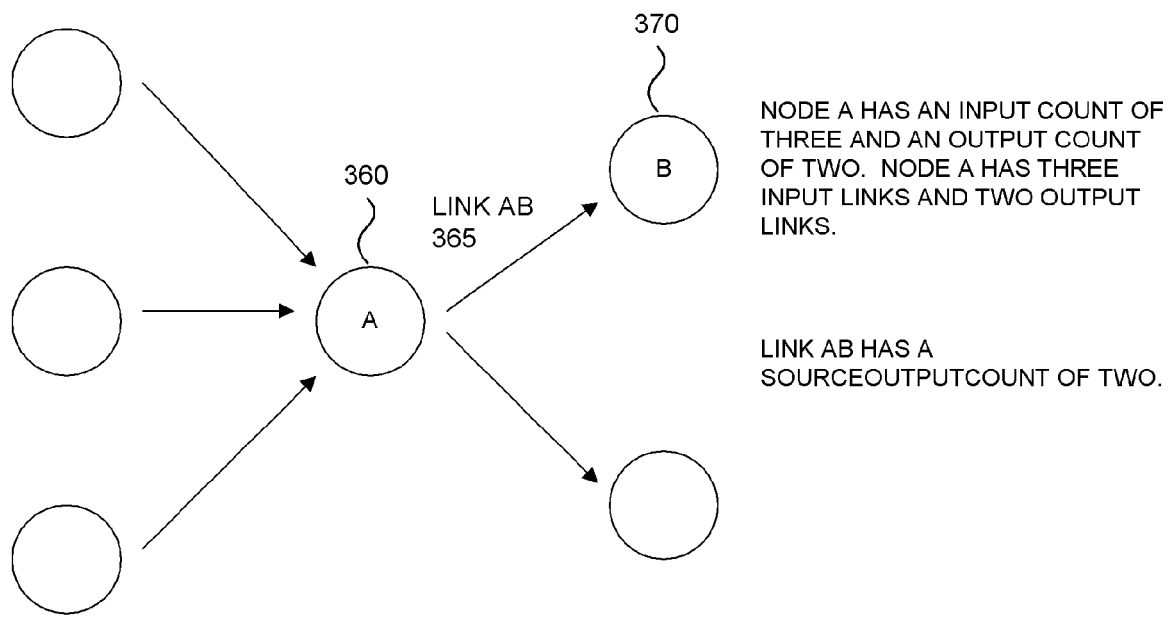

Nodes in a Boolean Network are joined by links. FIG. 3B is a general block diagram illustrating the linking of nodes in a Boolean Network. The node that a link points toward is called the "destination" or "targetnode". The node that the link points from is the "sourcenode". Nodes have an "input count" and an "output count". A node's input count is equal to the number of links (arrows) coming into the node. A node's output count is equal to the number of links (arrows) leaving a node. Links entering a node are called "input links", and links leaving a node are called "output links". A link's "source output count" is the output count of the link's source node. As shown at FIG. 3B, a link XY 345 links a node X 340 and a node Y 350. The link XY's source node is X 340. Link XY's destination (or target) node is Y 350. Also shown at FIG. 3B is a link AB 365 linking node A 360 and node B 370. Node A 360 has an input count of three and an output count of two. Node A 360 has three input links and two output links, including output link AB 365. Link AB 365 has a source output count of two.

Improved Performance Provided by Boolean Network

The Boolean Network rule engine of the present invention includes several features or aspects that are not provided by the traditional Rete and serve to improve performance and responsiveness of the rule engine in evaluation of rules. These include intelligent harvesting of inputs, expression factoring, assigning weighting to links and nodes, evaluation of related transducers, support for the OR operator, and activation/passivation of links at runtime. Each of these features are briefly described below.

The Boolean Network rule engine provides for intelligent harvesting of inputs. Only inputs which have changed are submitted to the Boolean Network at the time of evaluation. This differs from the traditional Rete which generally inspects every input that has been presented to the Rete network and computes whether or not every input is different before submitting the changed input (change set) to the Rete network. The approach of the present invention provides for sensing whenever an input to the Boolean Network has changed and performing the determination as to whether the actual value has changed at that point in time.

A primary purpose of the Boolean Network rule engine (as well as other rule engines) is to arrive at some conclusion based upon particular input data. The inputs are often numerous and a typical implementation environment may include hundreds or thousands of input data points. The methodology of the present invention frequently enables the system to determine that only one or two of these data points have changed since a prior evaluation. By submitting just those changes to the Boolean Network, the performance of the network is drastically improved when compared to the approach of evaluating all of the inputs.

The present invention also provides for several pre-processing steps which are performed during a deployment phase (also referred to herein as a "design/compile" phase) to facilitate improved evaluation of rules at runtime. One such step provides for factoring of expressions before the inputs are submitted to the Boolean Network. Expression factoring has to do with the actual structure of the Boolean Network and how it shares expressions. A rule can be considered to be similar to an algebraic equation as it comprises an expression of a number of terms that are combined using conditional logic (i.e., AND and OR operators). With a collection of rules, there is also a corresponding set of equations. Expression factoring is a pre-processing step in which all those equations are taken together in the aggregate and analyzed for common terms. By providing a level of factorization of expressions, the number of expressions that must be evaluated at runtime can be reduced, thereby improving system performance.

As described above, a Boolean Network that is built by the system of the present invention based on a ruleset includes a set of transducers and a collection of logic gates. The logic gates are connected by links which can be considered to be somewhat similar to those of an electronic circuit. The present invention provides for assigning weights to various links in the Boolean Network in an intelligent fashion so as to more efficiently select the order in which transducers and logic gates are evaluated. The weights that are assigned in accordance with the methodology of the present invention are a measure of how likely it is that a particular link will be significant in the eventual outcome of a given rule. In other words, the weighting is based on how likely it is that the logic associated with particular links will be important for the correct evaluation of a rule. This represents a substantial departure from the traditional Rete which does not include this weighting concept.

This weighting of links takes advantage of the fact that in most cases a small number of the rules in a ruleset are actually going to evaluate to TRUE. Typically, a majority of rules in a given ruleset will evaluate to FALSE. The system of the present invention performs an analysis for determining which input(s) are more likely to be active. In other words, it determines which input(s) is more likely to be conducting of a signal through the Boolean Network. The system of the present invention switches links from passive to active only at the time that it is necessary to do so and based on the weighting which indicates the order in which particular links are likely to determine the result of the rule. For example, if one of the inputs to an OR logic gate is TRUE, then the other inputs are insignificant. Similarly, if one of the inputs to an AND gate is FALSE, then the other input(s) to the AND gate are not relevant to the outcome of the rule. For instance, a given AND gate may have two inputs. The system of the present invention determines during the deployment phase that one of the two inputs is more likely to be significant than the other input in determining the overall outcome. The assigned weighting provides that the one that is more likely to be significant is usually evaluated first.

The methodology of the present invention provides for "listening" on one input first and only activating the second input when it is necessary to do so. The harvesting of input data points is one of the more expensive operations that is performed by the system during the process of evaluating rules. Thus, passivating a large number of the transducers (the point of contact between the data and the network), so that the need to harvest data can be eliminated for these transducers in many cases, can serve to considerably improve system performance.

In addition to weighting, the present invention also provides for activation and passivation of links and gates at runtime as a given rule is evaluated. The present invention introduces the concept of a network including active transducers, passive transducers, active links, passive links, active gates, and passive gates. During operation, the Boolean Network may determine that one of its inputs (i.e., an input to one of its logic gates) is irrelevant. For example, the second input to an OR gate is irrelevant when the first input to the OR gate is TRUE. When the system determines that an input is irrelevant, a passivation message is propagated through the network back to the transducer layer such that all the logic leading up to that input in the network (i.e., the one determined to be irrelevant) is passivated. This has the potential to greatly reduce future network activity. In particular, the process of gathering and evaluating data at one or more transducers may often be avoided, which improves system performance.

The weighting described above has to do with selecting which input(s) should be selected to be active when there is no other indication as to which inputs should be evaluated. In other words, weighting has to do with selecting in advance the order in which inputs should be evaluated. However, once some inputs have been evaluated (e.g., at one or more of the transducers) additional information is known and it may be possible to determine that certain inputs are no longer relevant to the outcome. The above-described passivation approach provides for passivating inputs not relevant to the outcome in a particular instance based on the data that has already been evaluated.

Another performance enhancement provided by the present invention is the coordinated evaluation of related transducers. A transducer converts a data value (from an input data point) into a Boolean value (i.e., either TRUE or FALSE). What often happens in analyzing large amounts of data is that a number of the transducers are interrelated. For example, a set of transducers may all relate to the same variable "A". They may, for example, include the following four conditions: A>1; A>2; A>3; and A>4. These transducers are related as they are all based on the same variable A and the solution to one of these transducers may imply the solution to others (e.g., if A is >4, then it is also greater than 1, 2, and 3). Instead of each transducer separately harvesting its input and evaluating the data, the present invention provides for bundling the transducers in the interests of improved efficiency as hereinafter described.

The system of the present invention also provides support for OR logic natively in the Boolean Network. While the traditional Rete itself only has AND gates, a Boolean Network constructed using the present invention may include both AND and OR gates. By providing direct support for OR logic, rulesets can have a smaller numbers of rules. Also, the support for OR operators provides for easier translation from a metadata representation that supports OR operations to an actual network (i.e., Boolean Network) used for rule evaluation at runtime. The components of the system of the present invention which implement the above described features and aspects will next be described.

System Components

The system of the present invention has two basic modes of operation. The first phase which is referred to below as the "deployment" or "design/compile" phase is the phase where a ruleset is built into a Boolean Network. The second phase is the runtime phase when one or more rules are evaluated based on input data (e.g., input data received from an application by the Boolean Network) in order to determine particular results.

Figure 4A:
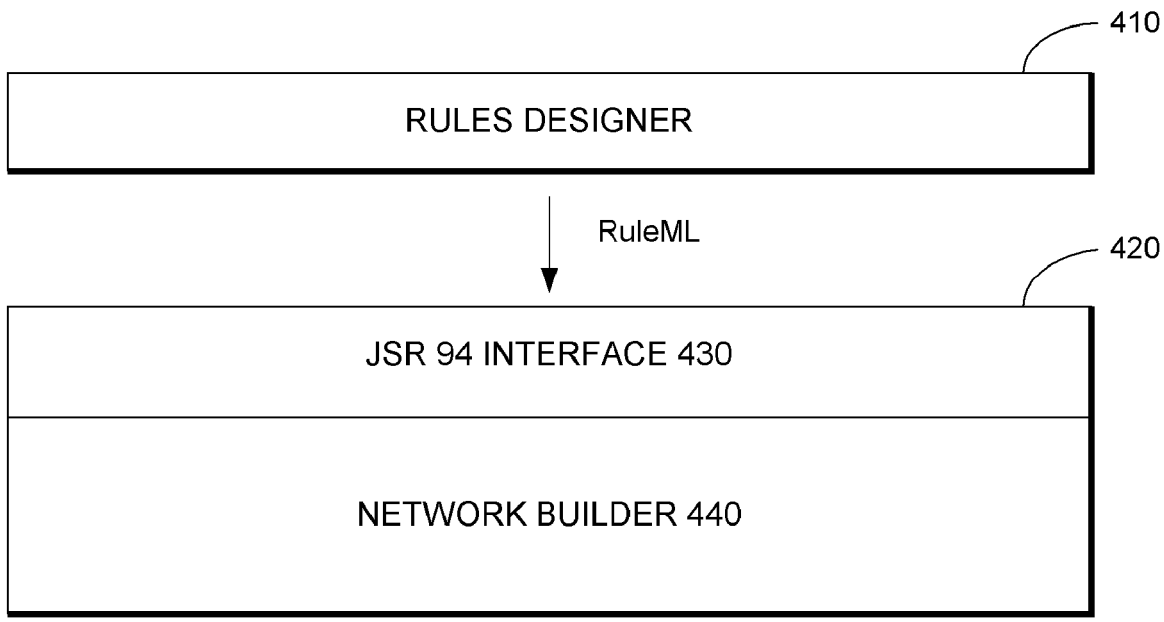
FIG. 4A is a high-level block diagram illustrating a deployment environment in which the system of the present invention may be utilized.

FIG. 4A is a high-level block diagram illustrating a deployment environment in which the system of the present invention may be utilized. The deployment phase is a design/compile phase in which a set of rules is built into a Boolean Network. A collection of rules can be built in an enhanced RuleML format using a tool or using a text editor. During the design process a business process designer and/or application developer may develop rules using a rules designer 410, as shown at FIG. 4A. The actual development of rules is independent of the present invention. As also shown at FIG. 4A, after rules have been created they are submitted to the Boolean Network rule engine 420. More particularly, rules written in RuleML are passed in to the Network Builder 440 component of the Boolean Network rule engine 420 via a standard JSR 94 interface 430. The Network Builder 440 constructs the actual topology of the Boolean Network based on the ruleset and hooks together the various nodes (i.e., transducers, logic gates, and so forth) of the Boolean Network.

Figure 4B:
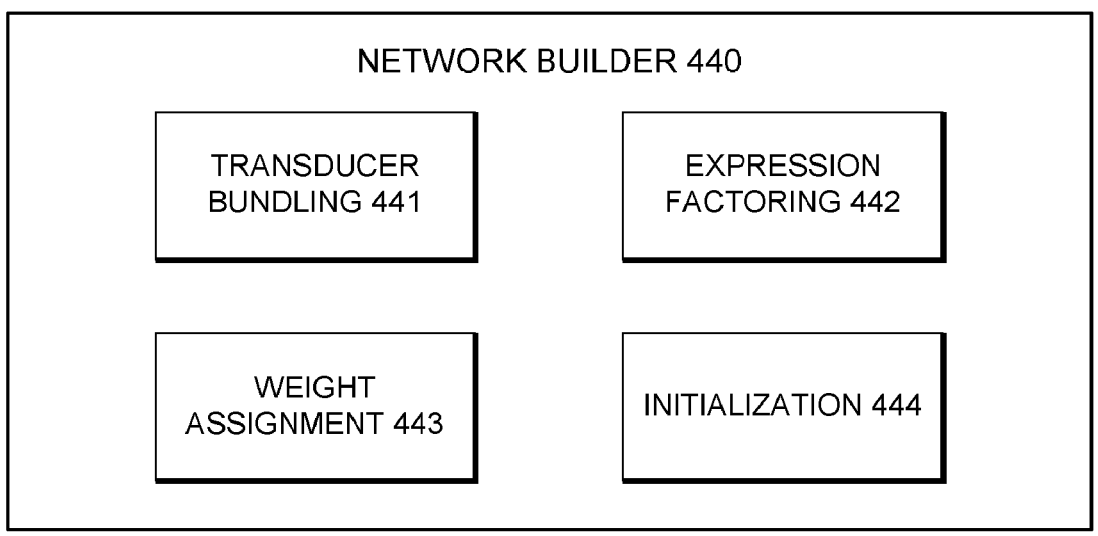
FIG. 4B illustrates the network builder of FIG. 4A in greater detail.

FIG. 4B illustrates the Network Builder 440 of FIG. 4A in greater detail. The modules 441-444 shown at FIG. 4B represent some of the operations performed by the Network Builder 440 during the building of a Boolean Network for a given ruleset. As shown, these include transducer bundling 441, expression factoring 442, weight assignment 443, and initialization 444. These operations are described below in more detail. Generally, the approach of the present invention provides for performing a number of complex and time consuming computations at deployment (design/compile) time so as to enable more efficient evaluation of the rules at runtime. By performing this work during the deployment phase when performance considerations are a lot less significant, performance at runtime can be considerably improved.

Figure 5A:
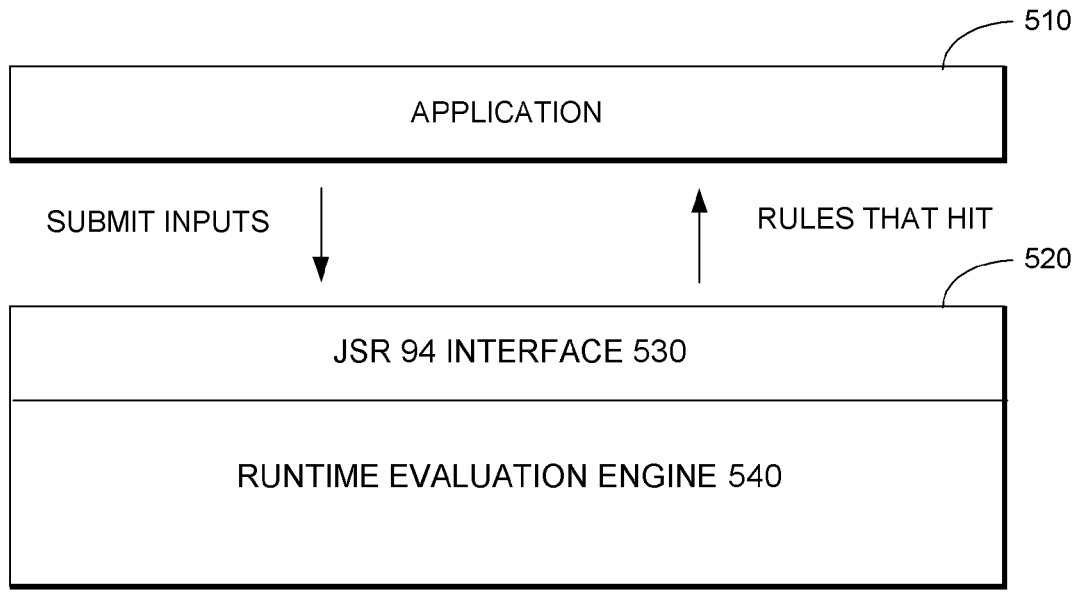
FIG. 5A illustrates the runtime environment in which the system of the present invention may be implemented.
Figure 5B:
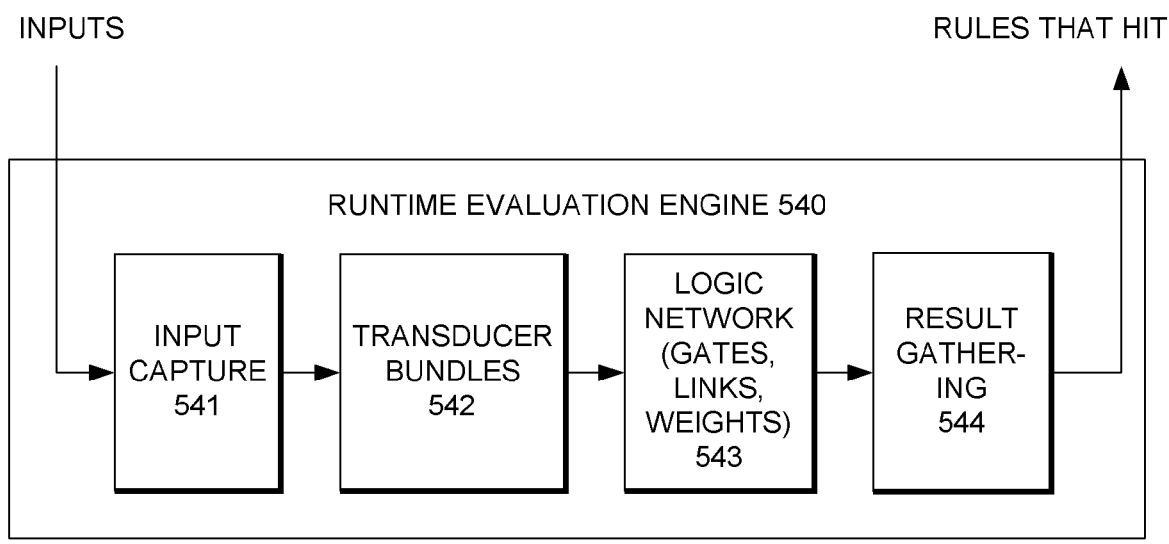
FIG. 5B is a block diagram illustrating the runtime evaluation engine of FIG. 5A in further detail.

The runtime environment in which the system of the present invention may be implemented is illustrated at FIGS. 5A-B. FIG. 5A is a high-level block diagram of a runtime environment in which the system of the present invention may be utilized. As shown at FIG. 5A, inputs from application 510 are submitted to the Boolean Network rule engine 520 through a JSR 94 interface 530. The runtime evaluation engine 540 of the Boolean Network rule engine 520 performs an evaluation based on those inputs and returns some indications as to which rule(s) evaluate to TRUE (i.e., which rules are "rules that hit") based on the given inputs.

FIG. 5B is a block diagram illustrating the operations of the runtime evaluation engine 540 in evaluating rules at runtime in further detail. The runtime operations of the runtime evaluation engine 540 include four general sets of activities or operations which are represented by the following blocks shown at FIG. 5B: input capture 541, transducer bundles 542, logic network (gates, links, weights) 543, and result gathering 544. Each of these will now be briefly described.

Input capture 541 comprises an observer-based recall which inputs the changed inputs from a previous rule evaluation (if applicable). The methodology of the present invention provides for detecting changed inputs so as to avoid the need to evaluate all inputs to determine which ones have changed.

The transducer bundles 542 provide for more efficiently evaluating related transducers. During the deployment phase, the system of the present invention bundles transducers to provide for more efficient evaluation of related transducers. At runtime, the system intelligently assigns the inputs to transducer collections that are grouped according to operation types. The evaluation of one transducer may enable the system to determine the results of one or more other related transducers without the performance impact of actually harvesting the required data and evaluating such related transducers.

Another aspect of the runtime operations of the Boolean Network rule engine is the logic network 543. The logic network 543 represents the actual logic that performs the rules evaluation. This includes the activation and passivation of links during the evaluation as hereinafter described. After the Boolean Network evaluation completes, the results are gathered and returned to the application as illustrated by the result gathering 544 at FIG. 5B.

The Boolean Network rule engine of the present invention, in its currently preferred embodiment, uses JSR 94 as its interface, enhanced RuleML as its metadata, and Boolean Network as its implementation. The Boolean Network rule engine implements JSR 94 as its interface. JSR 94 is a Java runtime API for rule engines. The API prescribes a set of fundamental rule engine operations. The set of operations is based upon the assumption that most clients need to be able to execute a basic multi-step rule engine cycle, which consists of parsing rules, adding objects to an engine, firing rules, and getting resultant objects from the engine. The set of operations also supports variations of the basic cycle, particularly variations what would occur in J2EE server deployments. A primary input to a rule engine is a collection of rules called a ruleset. The rules in a ruleset are expressed in a rule language. The JSR 94 specification defines generic API support for parsing rulesets, but does not define a rule language standard. The JSR 94 specification addresses the community's need to reduce the cost associated with incorporating business logic within applications, and reduce the cost associated with implementing platform-level business logic tools and services. For additional information see, "JSR 94: Java Rule Engine API", The Java Community Process Program, the disclosure of which is incorporated by reference. A copy of this document is available via the Internet (e.g., currently at jcp.org/aboutjava/communityprocess/first/jsr094/index.html).

The Boolean Network rule engine of the current invention uses RuleML-like metadata which is referred to here as "RuleML_BN". This RuleML-like metadata is compatible with RuleML version 0.8 and following versions. The RuleML Initiative was founded in August 2000 by Harold Boley (German Research Center for Artificial Intelligence (DFKI) GmbH, Kaiserslautern, Germany) and Said Tabet (Nisus Inc., Boston), with the goal of establishing an open, vendor neutral XML-based rule language standard. The RuleML Initiative has taken initial steps towards defining a shared Rule Markup Language (RuleML), permitting both forward (bottom-up) and backward (top-down) rules in XML for deduction, rewriting, and further inferential-transformational tasks. Rules can be stated in natural language, in some formal notation, or in a combination of both. Being in the third, "semiformal" category, the RuleML Initiative is working towards an XML-based markup language that permits Web-based rule storage, interchange, retrieval, and firing/application. This RuleML kernel language serves as a specification for immediate rule interchange. One or more rule engines are needed for executing RuleML rulebases. Recently, the RuleML Initiative was incorporated as part of the Java Specification Request JSR-000094 Java Rule Engine API. This has enabled cooperative development of complementary specifications for an open XML-based Rule Markup Language and the Java runtime API for rule engines. A Java Community Process effort referred to as JSR 94 worked to define a Java runtime API for rule engines. The resulting specification was approved as the "The JSR 94: Java™ Rule Engine API" (above) by the Java Community Process. The input of the Boolean Network rule engine is tied to a rule or the whole ruleset which the Boolean Network represents. A rule input provides at least a variable name, and then it could provide the variable value directly, or provide a rule handle and property key so that the variable value can be pulled out from a rule property set. A type specific input is preferred; and for property, the type of the property value is preferred to be specified in the input. The input tied to the whole ruleset is an input resolver object, and the real inputs to the rules could be pulled through the input resolver object. The XPATH resolver object is provided in the currently preferred embodiment of the present invention. The present invention also supports pluggable, user defined resolvers.

The output of the Boolean Network rule engine of the currently preferred embodiment of the present invention could be the pure Boolean value TRUE or FALSE with the rule identifier, if an element head is not defined in RuleML_BN for this rule; or the output of the Boolean Network rule engine could be the Boolean value TRUE or FALSE with the rule identifier, plus the structure representing the head defined in the rule. As it is specified in RuleML, the head section in RuleML is like a conclusion or action.

All transducers that are doing evaluations on expressions compose the transducer layer. Each transducer can only evaluate on one expression. The transducers performing different evaluations on the same subject are bundled together for optimization. Each transducer representing <atom> section with <_opr> as defined in RuleML will have a left operand and a right operand. It could only require one input if either the left operand or the right operand is a variable, or it could have two inputs when both the left operand and the right operand are variables. Each transducer representing <atom> section with <_opf> as defined in RuleML could have multiple inputs for parameter variables. The output of the transducer could be the input of the logic layer, or the evaluation result of a rule. Transducers should be able to be set to a passivated stage for optimization.

The Boolean Network logic layer is composed of AND gates and OR gates. The Boolean Network logic layer supports both conjunctive and disjunctive gates. The input of the gates comes from transducers, or other gates in the logic layer. The output of the gates is the inputs of the other gates in the logic layer, or the evaluation result of a rule. The gates can be set to a passivated stage for optimization, and the gates propagate the passivating/activating signal to its input links (transducers/gates).

The Boolean Network rule engine is easily deployable and configured for the managed J2EE environment. The current invention is also portable, capable of being implemented in and functioning on both Java 2 Platform, Standard Edition (J2SE) and J2EE environments. The Boolean Network rule engine of the current invention is defined at design time in a fixed structure format; all nodes and links cannot be changed at runtime. The Boolean Network rule engine is a stateful engine (i.e., it keeps the states during its lifetime). When applicable, it is the user's responsibility to save the Boolean Network instance to the database. The class that represents the Boolean Network is serializable. The Boolean Network rule engine is not designed to act as an Entity Bean, which saves any changes to the database whenever the change takes place. The reason for this is that one purpose of the Boolean Network is to serve a fast running network with potentially thousands of state changes happening every second, and to save every state change into the database is both expensive and pointless. The state of the Boolean Network can always be re-produced if the user feeds in the proper inputs.

One application in which the Boolean Network rule engine is particularly useful is for incorporation within a business process application. The Boolean Network rule engine may be used for data evaluation for a business process engine, or similar use, although the Boolean Network rule engine neither evaluates the control flows, nor performs the action after the evaluation. The Boolean Network rule engine may also be called from a message router in which case all inputs are available to the Boolean Network rule engine at the same time rather than supplied incrementally over several evaluations.

Deployment (Design/Compile Phase) Operations

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Building of Boolean Network Structure

In one embodiment, the Boolean Network rule engine of the present invention is implemented without passivating/activating activities. When a Boolean Network is implemented without passivating/activating activities, at the initial state, all inputs of transducers and gates are FALSE, and all outputs of transducers and gates are FALSE. All links are active, and all transducers and gates are active. No initialization is needed for this approach. In this approach with respect to the transducer layer, every transducer is evaluated if the input data is changed, and the evaluation result is sent to all output links of the transducer. If the transducer output is related to a rule, the result is recorded with the rule handle. In this first approach with respect to the logic layer, if the gate has a change in the output its output signal is sent to the output links. If the gate's output is related to a rule, the result is recorded with the rule handle.

In its currently preferred embodiment, the present invention incorporates an alternative approach which incorporates passivating/activating activities. There are two possible implementations for gates: one is referred to as "Two Input Gate", which only allows two input links for each gate like the Rete algorithm, and the other implementation is referred to as "Multiple Input Gate", which allows any number of input links for each gate. A user may configure the Boolean Network rule engine through the properties set with the ruleset to be a Two Input Gate or a Multiple Input Gate. The following discussion describes the operations of the present invention which is implemented using the Two Input Gate implementation as this is used in the currently preferred embodiment. However, the system and methodology of the present invention may also be used in a Multiple Input Gate implementation. Accordingly, the following discussion and examples of a Two Input Gate implementation are for purposes of illustration and not limitation.

In the currently preferred embodiment of the present invention RuleML_BN metadata is used for ruleset input. The Boolean Network structure is built from the ruleset, which means that the Boolean Network does not use the structure mapped to RuleML_BN directly. Consequently, in its currently preferred embodiment, the present invention does not create the structure mapped to RuleML_BN, but uses a Document Object Model (DOM) to represent the ruleset. Additionally, RuleML_BN is transformed to the Boolean Network through class BNRuleMLToBN so that the transformation need only occur once during the deployment phase.

A Boolean Network structure may be built from RuleML_BN implementing the following attributes. A transducer is created for an <atom> ... </atom>. The same <atom> ... </atom> defined in different rules share the same transducer. A transducer may have a left operand and a right operand, and either the left operand or the right operand could be <var> or <ind>, or both operands could be <var>. If more than two <var> or more than two mixed <var> <ind> are defined in the <atom>, multiple transducers are created and an AND gate connects all of these transducers together.

An individual is created for <ind> ... </ind>. An individual is a constant. A variable is created for <var> ... </var>. The input object of the Boolean Network should relate to the variables. The same variable defined in different transducers results in the bundling of these transducers, which means the transducers performing different evaluations on the same variable are bundled together as hereinafter described. A transducer may be related to a list of transducers such that: (1) when the current transducer evaluates to TRUE, all these transducers are set to FALSE; (2) when the current transducer evaluates to TRUE, all these transducers are set to TRUE; (3) when the current transducer evaluates to FALSE, all these transducers are set to TRUE; (4) when the current transducer evaluates to FALSE, all these transducers are set to FALSE; and (5) a transducer could be related to another transducer and their evaluation results are mutually exclusive.

Currently, a simple operation is created for <_opr> ... </_opr>. A simple operation defines a process performing on the variables and/or individuals defined in this transducer directly. A simple operation contains a relation <rel> ... </rel>. A functional operation is created for <_opf> ... </_opf>. A functional operation defines a process which performs on the variables and/or individuals defined in this transducer via a function. A functional operation contains a <fun> ... </fun>.

At least one AND gate is created for <and> ... </and>. An AND gate could have input links from transducers, other AND gates, and OR gates. An AND gate could have output links to other AND gates and OR gates. An AND gate could also have output links related to the rules directly. For a Two Input Gate implementation an AND gate can only have two inputs, so if there are more than two <atom> or <or> defined under the <and>, multiple AND gates are created to insure the two inputs for each gate. For a Multiple Input Gate implementation only one AND gate is created for each <and> ... </and> definition.

At least one OR gate is created for <or> ... </or>. An OR gate could have input links from transducers, other OR gates, and AND gates. An OR gate could also have output links to other OR gates and AND gates. An OR gate could have output links to the rules directly. For Two Input Gate implementation an OR gate can only have two inputs, so if there are more than two <atom> or <and> defined under the <or>, multiple OR gates are created to insure the two inputs for each gate. For Multiple Input Gateimplementation only one OR gate is created for each <or> ... </or> definition.

In the currently preferred embodiment of the present invention all inputs of transducers and gates are UNKNOWN, and all outputs of transducers and gates are UNKNOWN. All links are active, and all transducers and gates are active. To initialize the Boolean Network of the present invention, two input links are recorded separately as high weighted input link and low weighted input link. The low weighted input link is chosen to be active, and the high weighted input link is passivated for AND gates. For OR gates both input links are currently set to active.

An alternative initialization process for the current invention is to use a built-in method. In this approach the network is fed a FALSE signal by setting the transducer's output to FALSE. The advantage of this approach is that the transducers and gates may be automatically set to a passivated state if their output links are all passivated. In the prior implementation there is one active input link for AND gates, and all active input links for OR gates. Furthermore, passivated gates could cause more links, gates, and transducers to be passivated. The process of building related transducer bundles will next be described.

Building Transducer Bundles During Deployment Phase

Figure 6A:
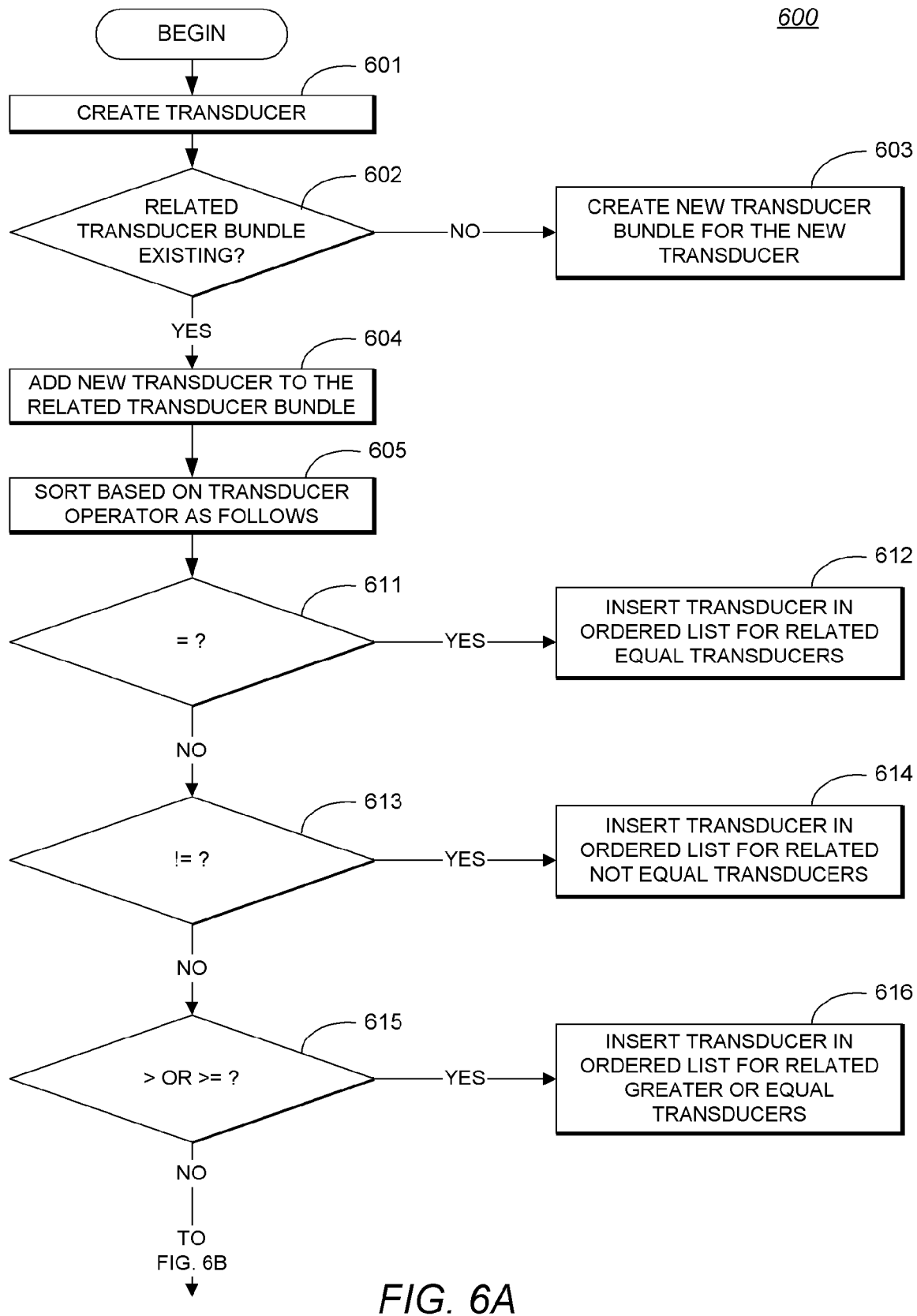
FIGS. 6A-C comprise a single flow diagram illustrating the building of related transducer bundles during the deployment phase.
Figure 6B:
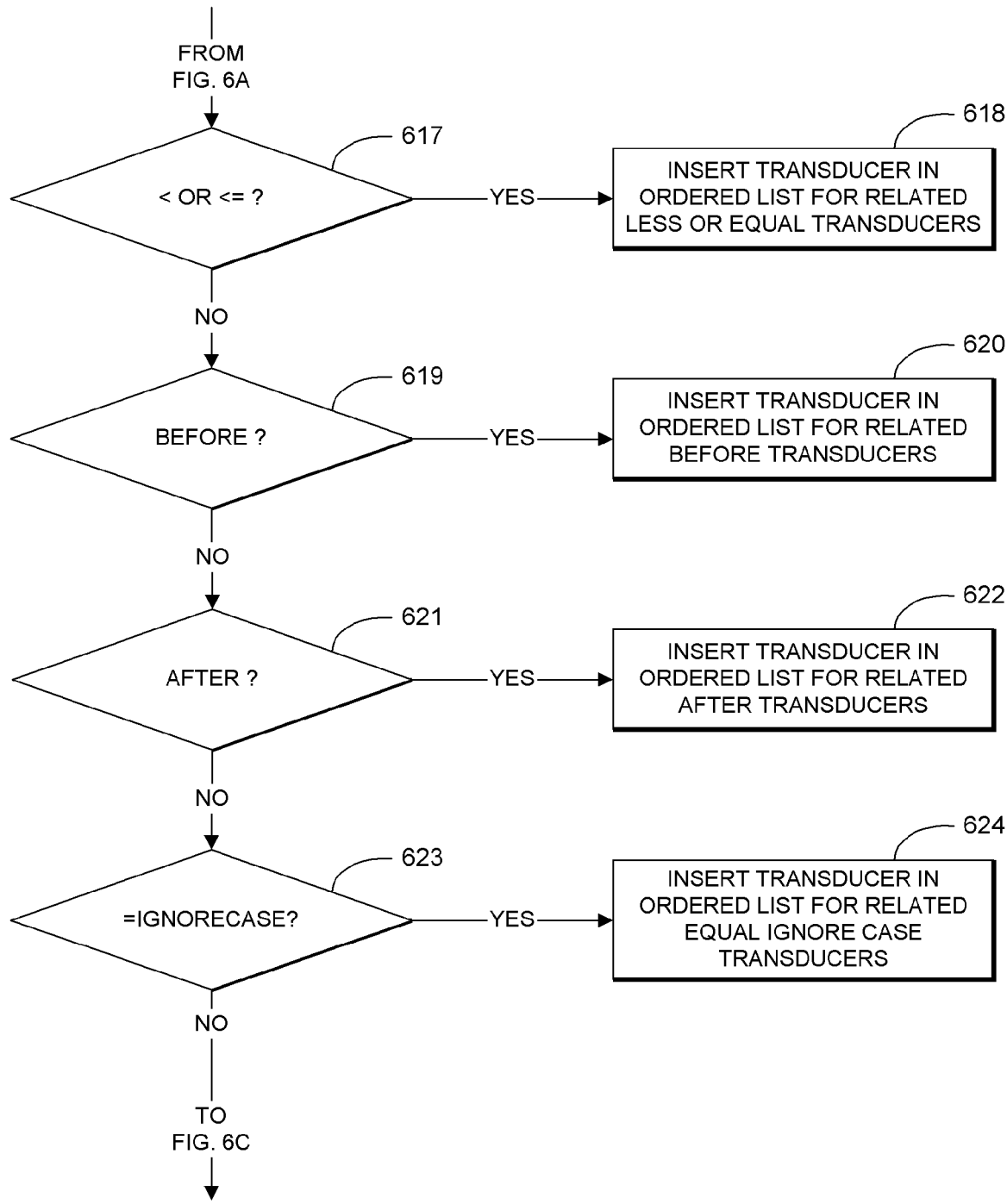
Figure 6C:
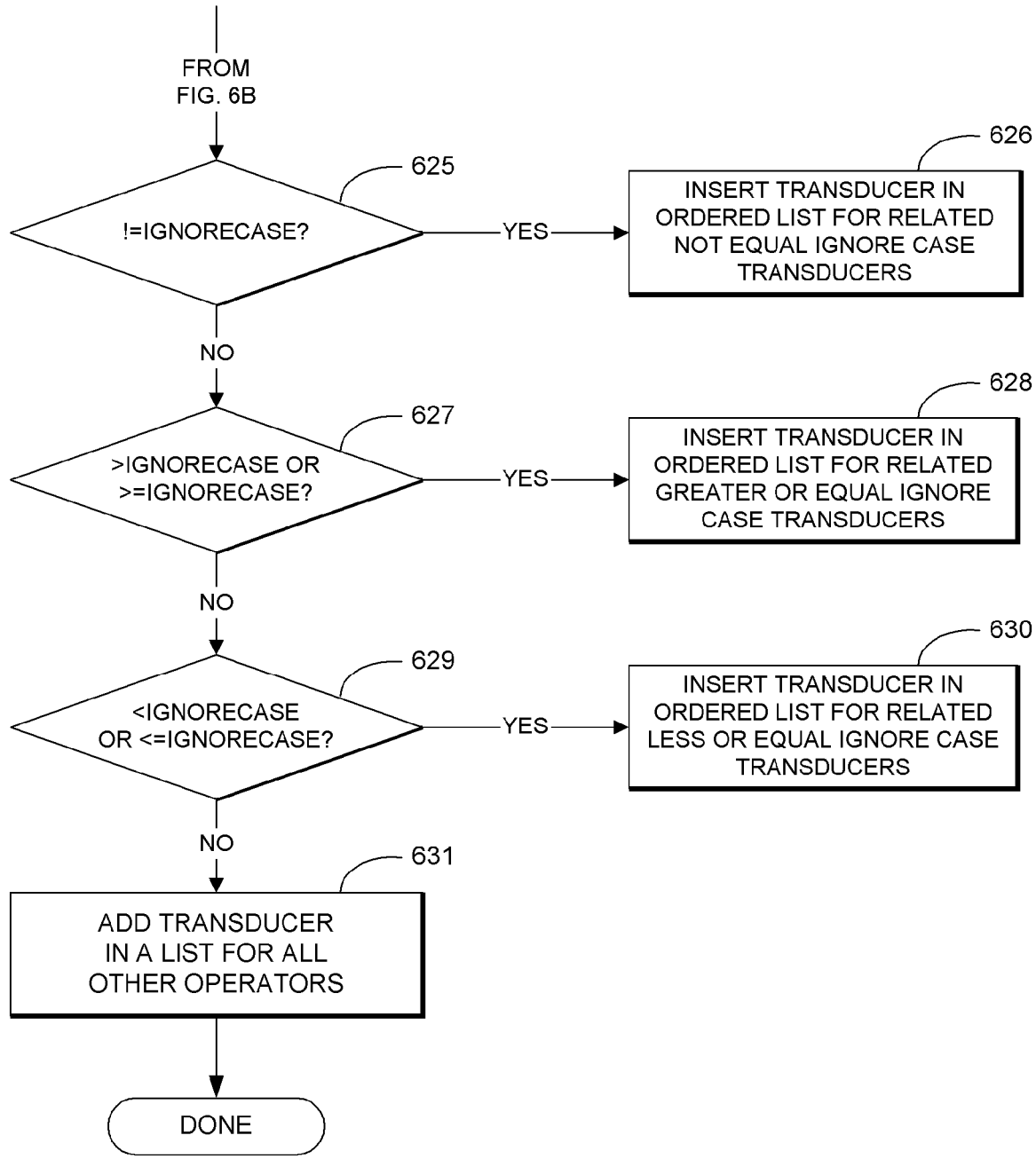

FIGS. 6A-C comprise a single flow diagram 600 illustrating the building of related transducer bundles during the deployment (design/compile) phase. As described above, during the deployment phase a Boolean Network is built based on parsing an input ruleset (e.g., a set of rules written in RuleML). During this process of parsing the input ruleset, the system of the present invention builds the various components of the Boolean Network to represent the ruleset, including the transducers. The methodology of the present invention provides for bundling of related transducers which is one of the differentiating characteristics of the present invention and provides performance advantages over prior art systems.

The process of building a transducer begins at 601 with the creation of a transducer when a variable is encountered during the parsing of the ruleset (e.g., RuleML document). The methodology of the present invention associates transducers with a bundle (i.e., a bundle of related transducers) to provide for improved efficiency in rule evaluation at runtime. Accordingly, at 602 a check is made to see if the related transducer bundle for this transducer already exists. A bundle (or related transducer bundle) is a group of interdependent transducers such that the evaluation of one transducer may imply the evaluation of the others. For example, if it is already known that variable A is not greater than 1, then there is no need to evaluate whether A is greater than 2 or 3, and so forth. The answer to the first (i.e., A is not greater than 1) implies the answer to the others. As another example, a list of transducers with the equal operator may be created. If one of the equalities on this list resolves to TRUE (e.g., B=1 is TRUE), then others will be FALSE (e.g., B=2 is FALSE if B=1 is TRUE).

The process branches at 602 based on whether or not a related transducer bundle already exists for the transducer. If the related transducer bundle does NOT already exist, at 603 a new bundle is created and the transducer is added to the new related transducer bundle. However, if the bundle DOES already exist, then the new transducer is added to the related transducer bundle at 604. At 605 the operator of the transducer is checked and intelligent sorting is then performed based on the transducer operator. Transducers have an operator (e.g., the greater than (>) operator) that they apply to input data in order to determine a result (i.e., TRUE or FALSE). The rest of this flow diagram at 611-631 provides for sorting the transducers based on the transducer operator to enable such transducers to be more efficiently evaluated at runtime. The decision logic shown at 611-631 of this flow diagram performs the sort based upon the operator of the transducer. As shown, the operators include equal (=), not equal (!=), greater than/greater than or equal to (> or >=), less than/less than or equal to (<or <=), before, after, equal to (Ignore case), not equal to (Ignore case), greater than/greater than or equal to (Ignore case), less than/less than or equal to (Ignore case), and "other" operators. The before and after operators refer to date/time information. The operators including "Ignore case" (e.g., greater than/greater than or equal to (Ignore case)) are generally used for string comparisons. If the operator does not match any of those indicated at 611, 613, 615, 617, 619, 621, 623, 625, 627, 629, then the transducer is added to the list of "others". In the presently preferred embodiment, the transducers with operators other than those specified are simply maintained in a list as provided at 631.

Expression Factoring

Another set of operations that are performed during the deployment (design/compile) phase when processing RuleML rules relate to factoring of expressions. Expression factoring involves extracting commonality from the rules equations. A rule is typically defined without respect to other rules in the ruleset. The Boolean Network rule engine of the present invention performs expression factoring to extract commonality from the expressions in a ruleset during the deployment phase. Consider, for example, the following set of two rules:

Rule1=(a>1) AND (b>1) AND (c>1)
Rule2=(b>1) AND (c>1) AND (d>1)

The Boolean Network rule engine determines that the subexpression ((b>1) AND (c>1)) is common to both Rule1 and Rule2, and therefore, should only be computed once. Perfectly factoring a non-trivial set of rules is not practical, but the Boolean Network rule engine is capable of extracting common subexpressions from ANDed terms as in the previous example.

Figure 7A:
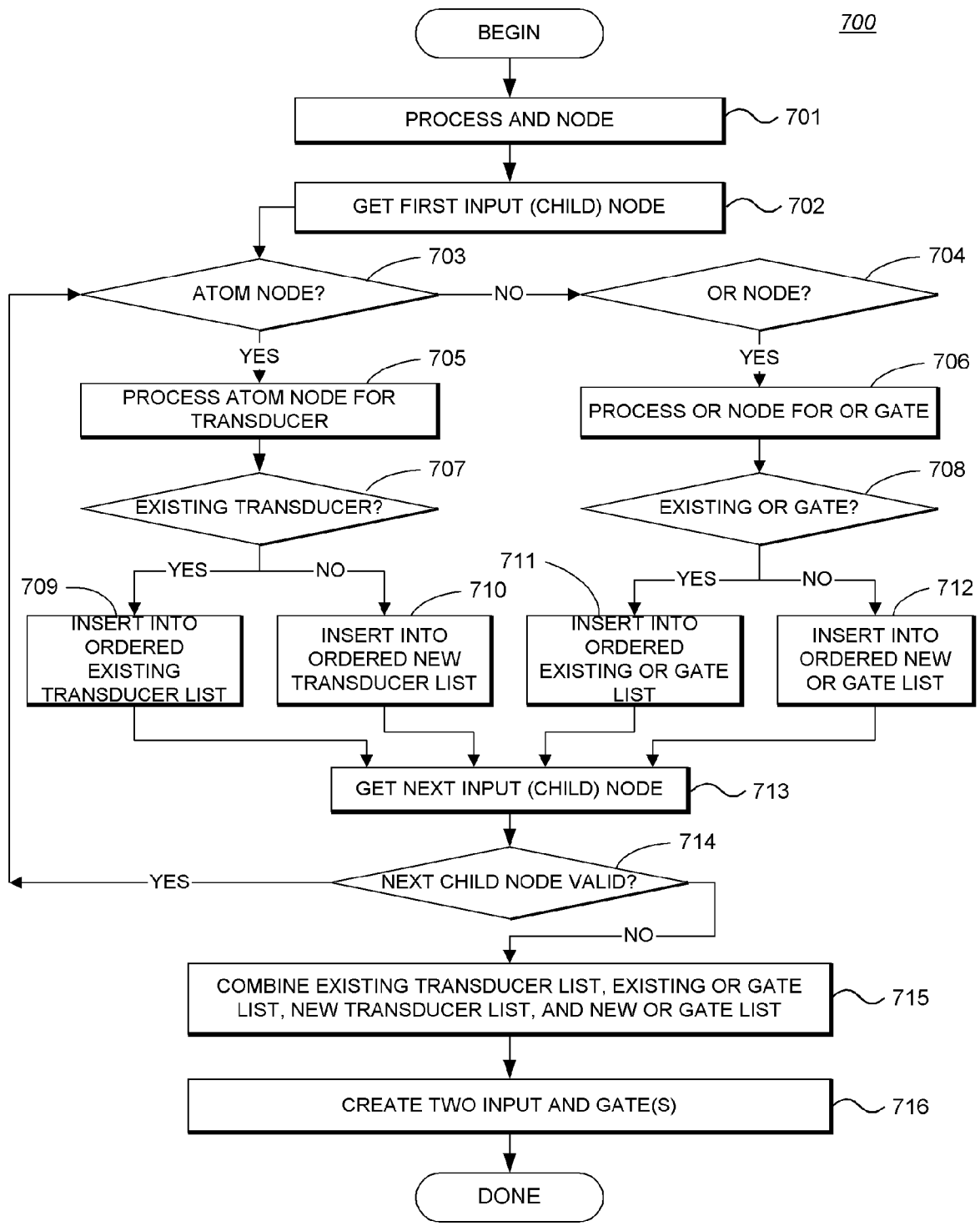
FIGS. 7A-B illustrate the expression factoring process that is performed during the building of a Boolean Network representation of a ruleset.
Figure 7B:
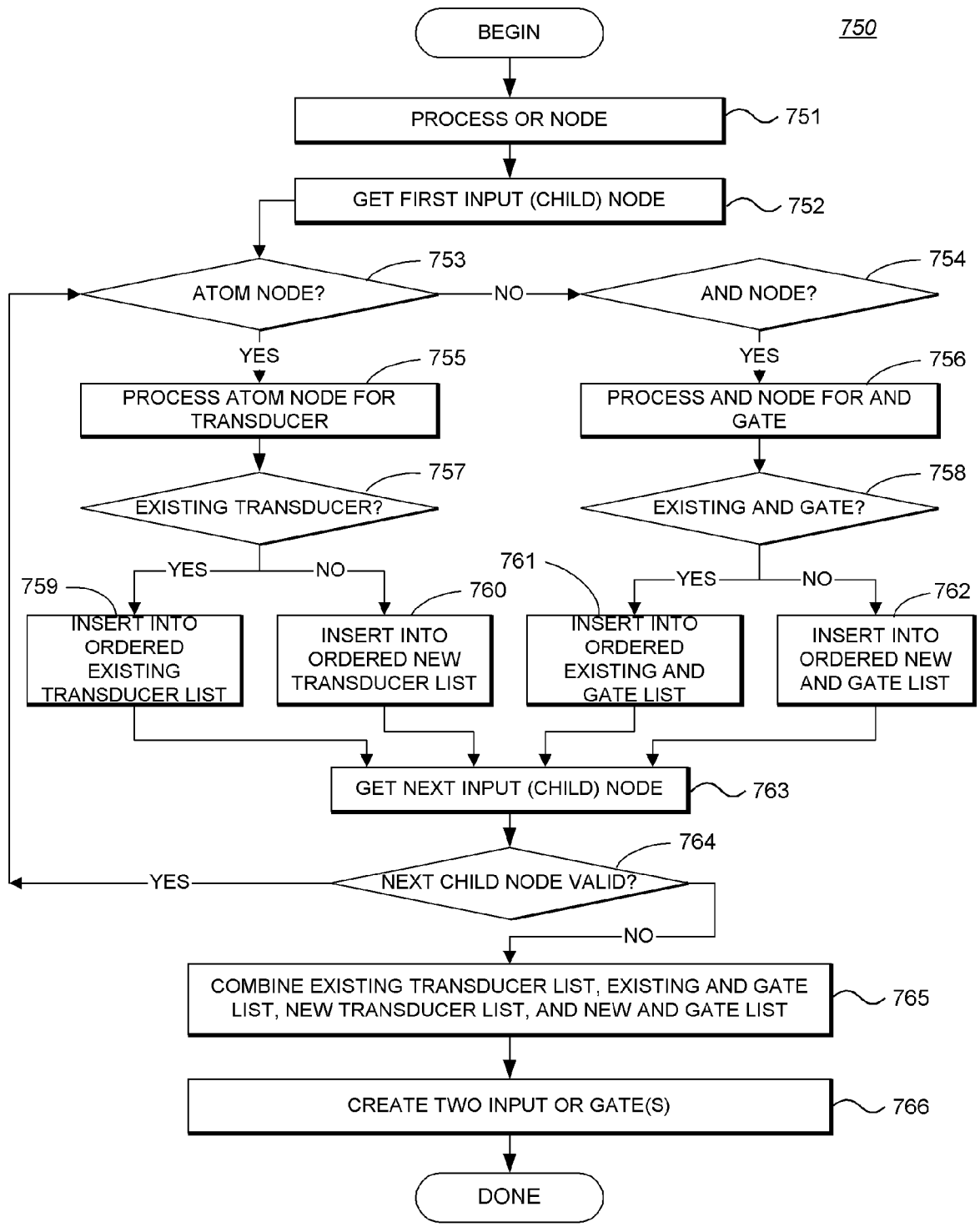

FIGS. 7A-B illustrate the expression factoring process that is performed during the building of a Boolean Network representation of a ruleset. FIG. 7A is a flow diagram 700 illustrating the processing that occurs when an AND logic gate is encountered. When processing a ruleset to build the Boolean Network representation, the process of expression factoring is initiated when an AND gate is encountered at 701. When an AND operator is encountered, the system will, at 702, obtain the AND node's first input node which is referred to in the following discussion as the first "child" node. For example, one input of the first expression above is b>1. At 703, a determination is made as to whether this child node is an atom node (as defined under RuleML). An atom (<atom>) node is a node that has a variable and an operator and has a comparing to value (e.g., a variable or a constant).

If the child is an atom node, the atom node is processed for a transducer at 705. A transducer always maps to an atom node. When it processes an atom node for creating a transducer, the system determines if the transducer already exists at 707. If the transducer already exists, then the new transducer is inserted into an existing transducer list at 709. When a transducer already exists, it is sorted so that the AND gate that has already been created can be reused. This avoids creating more gates when additional gates are not necessary. The Boolean Network rule engine maintains different lists for sorting existing transducers and new (not already existing) transducers. If the transducer does not already exist, it is added into an ordered new transducer list at 710. After the transducer is added to the appropriate list (new or existing), the system attempts to obtain the next child node at 713.

If the next child node is valid at 714 then the process returns to 703 to determine if the next child node is an atom node or an OR node. Assume in this case that the child node is not an atom node. In this event, a check is made to determine if it is an OR node at 704. If it is an OR node, then the OR node is processed at 706. At 708, a determination is made as to whether it is an existing OR gate. The node is then sorted into one of two lists based on whether it is an existing OR gate or a new OR gate as shown at 711, 712, respectively. It may be possible to reuse an existing OR gate and the methodology of the present invention provides for reusing an existing gate if possible so as to provide for more efficient rule evaluation. After the OR gate is inserted into a list, the next child node is obtained at 713.

When all of the child nodes have been processed, the check at 714 will not find another valid child node. In this case, all of the sorted lists of existing transducers, existing OR gates, new transducers, and new OR gates are combined into one list at 715. Next, two AND input gate(s) are created at 716. The methodology of the present invention provides for taking the first node in the list and the second node in the list and checking to see if there is already an AND gate for these nodes. If not, then a new AND gate is created. However, if there is already an AND gate then the existing AND gate will be used. The system will then take that AND gate as an input and take the next node from the list and check again and see if there is already an existing AND gate for the nodes. If there is an existing AND gate, then the existing gate will be used. If not, then a new AND gate is created.

FIG. 7B is a flow diagram 750 illustrating the processing that occurs when an OR logic gate is encountered. When processing a ruleset to build the Boolean Network representation of the ruleset, the process of expression factoring illustrated at FIG. 7B is initiated when an OR gate is encountered. As shown at 751-766, the processing that occurs is similar to the processing of an AND gate as described above and illustrated at FIG. 7A. The weighting of links will next be described.

Weighting of Links

The Boolean Network rule engine of the present invention introduces the concept of weighted links. By assigning appropriate weights to links, the network in the currently preferred embodiment of the current invention is optimized to avoid expensive broadcasts, which historically has been a problem of prior Rete-based rule engines. Another advantage of the present invention is that the network also modifies its weights dynamically so that it learns to avoid unnecessary computational activity.

The routine that performs the assignment of weights to links is as follows:

```
1:     public void init( ) throws BNNodeWithoutOutputLinkException,
2:             BNNodeWithoutInputLinkException {
3:         if (_tmpInputLinks != null) {
4:         // not init yet
5:             // call parent class' init( )
6:             super.init( );
7:
8:             // get first and second link
9:             BNSmartNode link1 = (BNSmartNode)_tmpInputLinks.get(0);
10:            BNSmartNode link2 = (BNSmartNode)_tmpInputLinks.get(1);
11:            if (link1.totalOutputLinks( ) >= link2.totalOutputLinks( )) {
12:            // first one has more weight
13:                // assign high weight link
14:                _highWeightedInputLink = link1;
15:                // assign low weight link
16:                _lowWeightedInputLink = link2;
17:            } else {
18:            // first one has less weight
19:                // assign high weight link
20:                _highWeightedInputLink = link2;
21:                // assign low weight link
22:                _lowWeightedInputLink = link1;
23:            }
24:            // this member variable is done
25:            _tmpInputLinks = null;
26:        }
27:    }
28:    ...
29:    ////
30:    // protected member variables
31:    ////
32:    protected BNSmartNode _highWeightedInputLink = null;
33:    protected BNSmartNode _lowWeightedInputLink = null;
34:    protected boolean _isHighWeightedInputLinkActive = true;
35:    protected boolean _isLowWeightedInputLinkActive = true;
36:    protected boolean _isHighWeightedInputLinkContributedToCount = false;
37:    protected boolean _isLowWeightedInputLinkContributedToCount = false;
```

As shown at line 11, the output links (i.e., source output count) of two links are compared. The higher initial passivation weight is assigned to the first link if the first link's source output count is greater than or equal to the output count of the second link. It should be noted that the above routine provides for setting passivation weights. As a result, links with low source output counts are assigned low passivation weights. This means that these links with low output counts are generally activated before links with high source output counts.

Support for OR Logic

For convenience, the Boolean Network, in its currently preferred embodiment, provides for implementation of OR support. The Boolean Network allows rules which contain OR operations, even though equivalent functionality could be provided by a larger set of rules which contain only AND operations. The traditional Rete algorithm does not support OR operations. The Rete algorithm effectively offloads the ORing to the user. Consider a rule which contains an OR operation:

(a>7)|(b<5)

The preceding could be equivalently expressed by the following two rules:

(a>7)
(b<5)

The Boolean Network of the present invention accommodates N-input (i.e., multiple input) nodes. The Boolean Network allows for AND and OR nodes with more than two inputs. The current embodiment does not employ nodes with more than two inputs; this is merely an implementation choice. Another benefit of the present invention is that using two input nodes exclusively allows for simpler data structures in the network implementation. Simpler data structures yield better performance. Using two input nodes also allows for better factoring of rules expressions.

Runtime Operations

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Boolean Network General Runtime Methodology

When a user inputs data into the Boolean Network, the input layer is responsible for routing the data into the proper transducers. If the input data is for the whole ruleset, each transducer is picked to feed in the data. When the Boolean Network is built, one map is built to store the variable name and its corresponding transducers, and one map is built to store the function name and its corresponding transducers. The first map is used in the case where there is a variable(s) defined in the rule and the rule is using a simple operation. The second map is used in the case where a rule is using a functional operation. If the input is for a variable, the input layer retrieves the variable name from the input data object, finds the transducer(s) from the map by the variable name, and sets the variable data into the transducer. If the input is for a function, the input layer retrieves the function name from the input data object, finds the transducer from the map by the function name, and sets the parameters defined in the input object into the transducer. Additionally, a user may plug in their own function to evaluate a user-defined expression. Again, if the input is for the whole ruleset, each transducer is picked, and the data is set into each transducer.

When data is set into the transducer, the transducer evaluates the defined expression automatically if the transducer is not passivated at that moment and the input data has not been evaluated against. If the transducer is producing a TRUE to FALSE or UNKNOWN to FALSE transition, first the FALSE signal is automatically propagated into the AND gates that are the active output links of the transducer, then it is propagated into the OR gates that are the active output links of the transducer. If the transducer is linked to a rule handle as the rule output directly, a FALSE value will be set associated to the rule handle. If the transducer is producing a FALSE to TRUE or UNKNOWN to TRUE transition, first the TRUE signal is automatically propagated into the OR gates that are the active output links of the transducer, then it is propagated into the AND gates that are the active output links of the transducer. If the transducer is linked to a rule handle as the rule output directly, a TRUE value is set associated to the rule handle. A transducer could be triggered to evaluate the expression if its state is changed from passivated to active. Usually this is caused by one of the output links sending back the activating signal.

When evaluation is called on the Boolean Network, if the Boolean Network is in a STATEFUL operation almost nothing needs to be done besides some cleaning up, since the evaluation is automatically taking place when an add object/update object is called. If the Boolean Network is in a STATELESS operation all transducers that had TRUE output before and no input related to them at this moment need to be found, and a FALSE signal needs to be propagated to their output.

Previously, the TRUE to FALSE results were automatically sent to the AND gate output links of the transducers, and the FALSE to TRUE results were automatically sent to the OR gate output links of the transducers. The TRUE to FALSE results for the OR gates, and the FALSE to TRUE results for the AND gates, were held to be fired later by the engine in order to produce the most efficient process. This approach was taken because a FALSE signal to an AND gate could cause all other input links of the AND gate to be passivated, and a TRUE signal to an OR gate could cause all other input links of the OR gate to be passivated. Unfortunately, this approach also causes some transducers to be passivated, and in some instances the hold signal could not be propagated at a later point in time, thereby possibly yielding a wrong evaluation result. To avoid a false evaluation result, either the signal should be allowed to go through the network when it is produced, or a check on passivating should be added and the passivate process denied if the input in the transducer is changed. In the current embodiment of the present invention the first approach is selected, which is to let the signal go through the network when it is produced, because the second approach may cause more overhead.

It is not possible to use the input value patterns on the transducers layer to prevent an intermediate false signal to be generated inside the logic layer during the process, because the network is composed of both AND gates and OR gates. The pattern works for AND gates (feed 1->0 first then 0->1), but it does not work for OR gates (which require feed 0->1 first then 1-0). It is inefficient to put a mechanism in place to ensure that every input pattern going into the gate is properly ordered. Fortunately, JSR 94 does not allow observers to be registered on the rule directly, so an intermediate false signal does not trigger the wrong event to be fired. When a user's call obtains results on the Boolean Network rule engine the intermediate false signals are already corrected by the input signals that are sent into the network later.

In the logic layer of the current embodiment of the present invention, when a transducer's output value changes and it is propagated into the OR gates, a TRUE input signal triggers the OR gates to send out passivating signals to its transducers/gates that are the input links of the current gate and is not the one inputting the TRUE signal. The OR gate then propagates its TRUE output signal to its output links. When a transducer's output value changes and it is propagated into the AND gates, a FALSE input signal triggers the AND gates to send out passivating signals to its transducers/gates that are the input links of the current gate and is not the one inputting the FALSE signal. When all inputs of an AND gate are TRUE, the AND gate propagates its TRUE output signal to its output links.

For a Two Input Gateimplementation the active input link, which is not currently sending the signal, is selected as the target for sending the passivated signal. For OR gates, any input signal having a TRUE to FALSE transition triggers the gate to send out the activating signal to its input links that were previously passivated. For AND gates, any input signal having a FALSE to TRUE transition triggers the gate to send out the activating signal to its input links that were previously passivated. In the Two Input Gateimplementation the passivated input link, which is not currently sending the signal, is selected as the target for the activating signal. A gate should propagate the passivating signal to its entire input links when the current gate changes from active to passivated status. A gate should propagate the activating signal to at least one of its input links when the current gate changes from passivated to active status. The operations of the Boolean Network rule engine at runtime are described below in greater detail.

Observer-based Transducer Nodes

Figure 8:
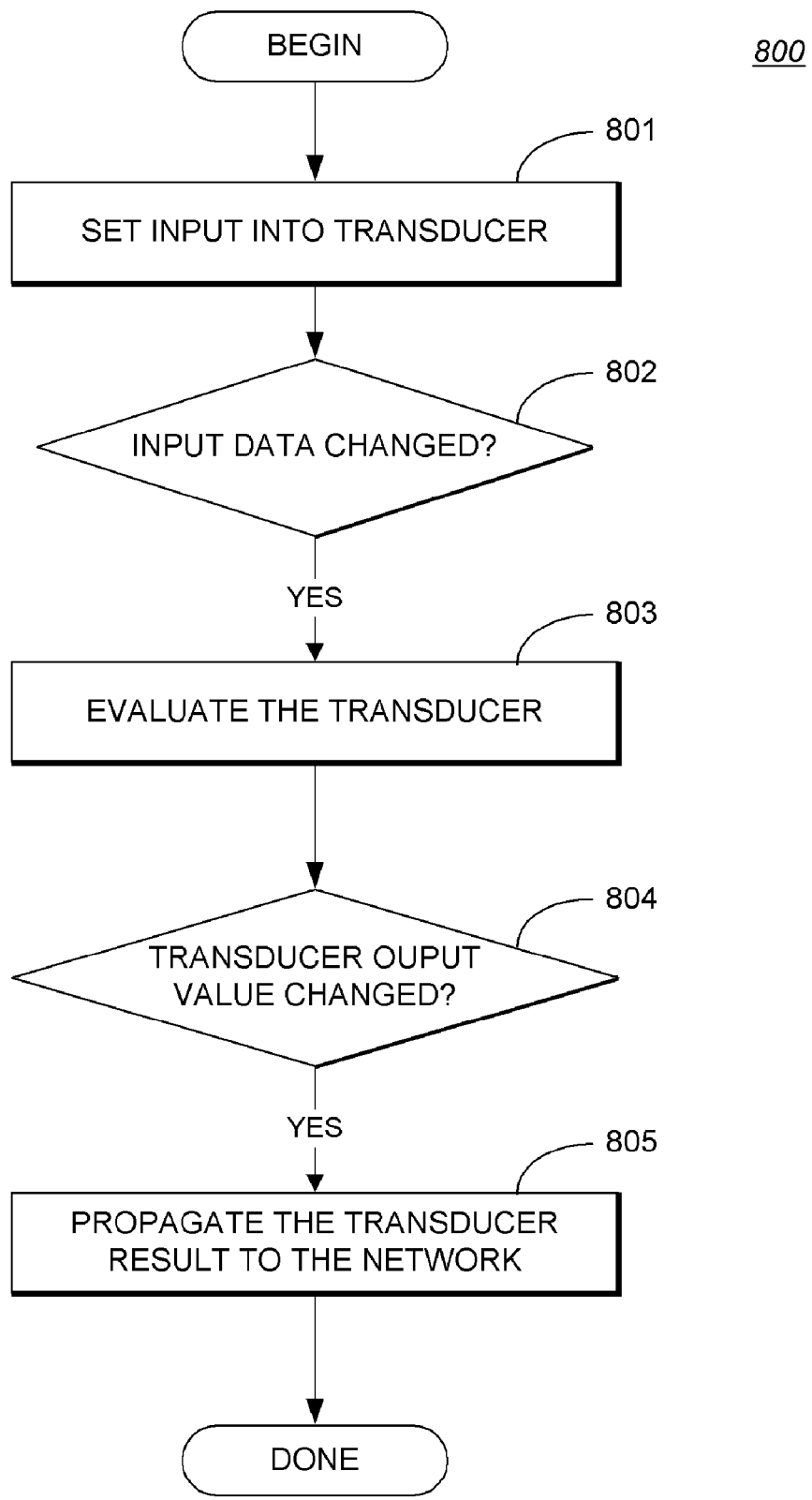
FIG. 8 is a flow diagram illustrating the detection at runtime of changed input data by observer-based transducer nodes of the present invention.

FIG. 8 is a flow diagram 800 illustrating the detection at runtime of changed input data by observer-based transducer nodes of the present invention. As shown, at runtime an application presents an input to a transducer at 801. When an input is received, the transducer determines whether or not the input data has changed at 802. A decision is made at 802 based on whether the input data has changed. If it is determined that the input data has changed, the process proceeds to 803 to evaluate the transducer. Otherwise, if the data has not changed, no further action is taken.

The transducer is evaluated at 803. A determination is then made as to whether the transducer evaluation (output value) has changed (i.e., from FALSE to TRUE or from TRUE to FALSE) at 804. If the transducer output has changed, then the output value is propagated to the network as provided at 805. The propagation of transducer results to the network is described below in greater detail.

A significant aspect of this process is that the inputs are identified or "observed" at the time that they are added or introduced to the network. The system and methodology of the present invention avoids cycling through all of the inputs to determine which of them have changed since the previous evaluation.

Runtime Transducer Evaluation

Figure 9A:
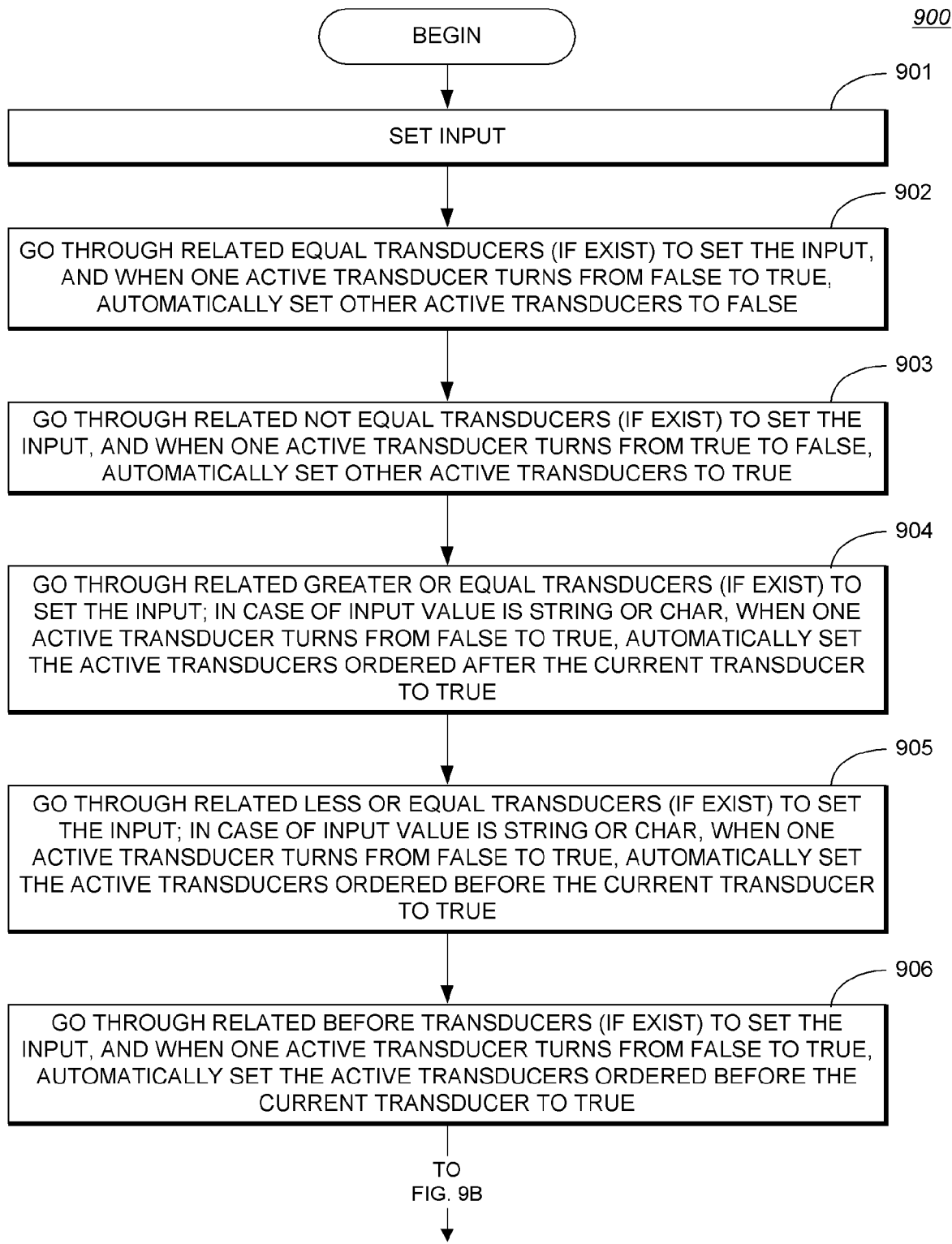
FIGS. 9A-B comprise a single flowchart illustrating the evaluation of transducers at runtime.
Figure 9B:
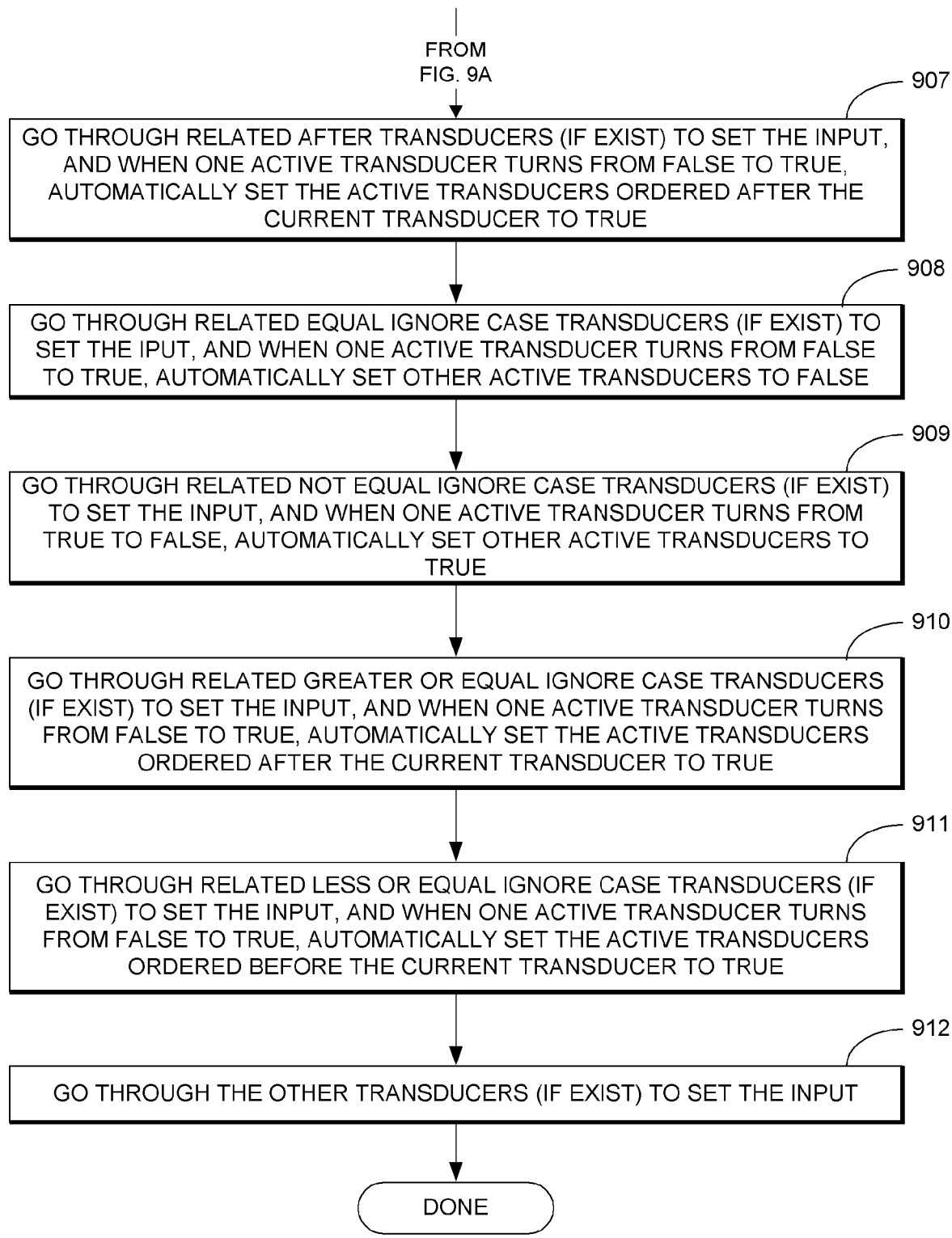

FIGS. 9A-B comprise a single flowchart 900 illustrating the evaluation of transducers at runtime. Recall that during the deployment phase, related transducers are sorted so that they can be more efficiently evaluated at runtime. During the deployment phase, performance is not really a consideration, so time can be taken to sort the transducers and put them in an order that will enable more efficient evaluation at runtime. At runtime, the system can leverage the fact that the transducers are sorted as the evaluation of one transducer may imply the values (results) of the others in many cases.

As shown, at runtime an input is set at step 901. At steps 902-911, the Boolean Network runtime engine goes through lists of all related transducers that have been sorted into lists based on the transducer operator as previously described. For example, an input may be received that indicates that variable A is equal to one (i.e., A=1). At step 902, the system goes through all related equal transducers (if they exist). When one active transducer (e.g., an active transducer for A=1) changes from FALSE to TRUE, then other active transducers in the related transducer list are automatically set to FALSE. This can be done because if the input indicates that A=1, then it is known that A cannot be equal to 2 or 3 or some other value. Accordingly, if one of these related transducers using the equal operator evaluates to TRUE, then the rest of the related transducers in the bundle are FALSE.

Steps 903-911 provide for similar operations to be performed for transducers having other operators. At step 912, the system goes through any other transducers (if any) that have operators other than those specifically indicated to set the input.

Activation and Passivation of Nodes and Links

Figure 10A:
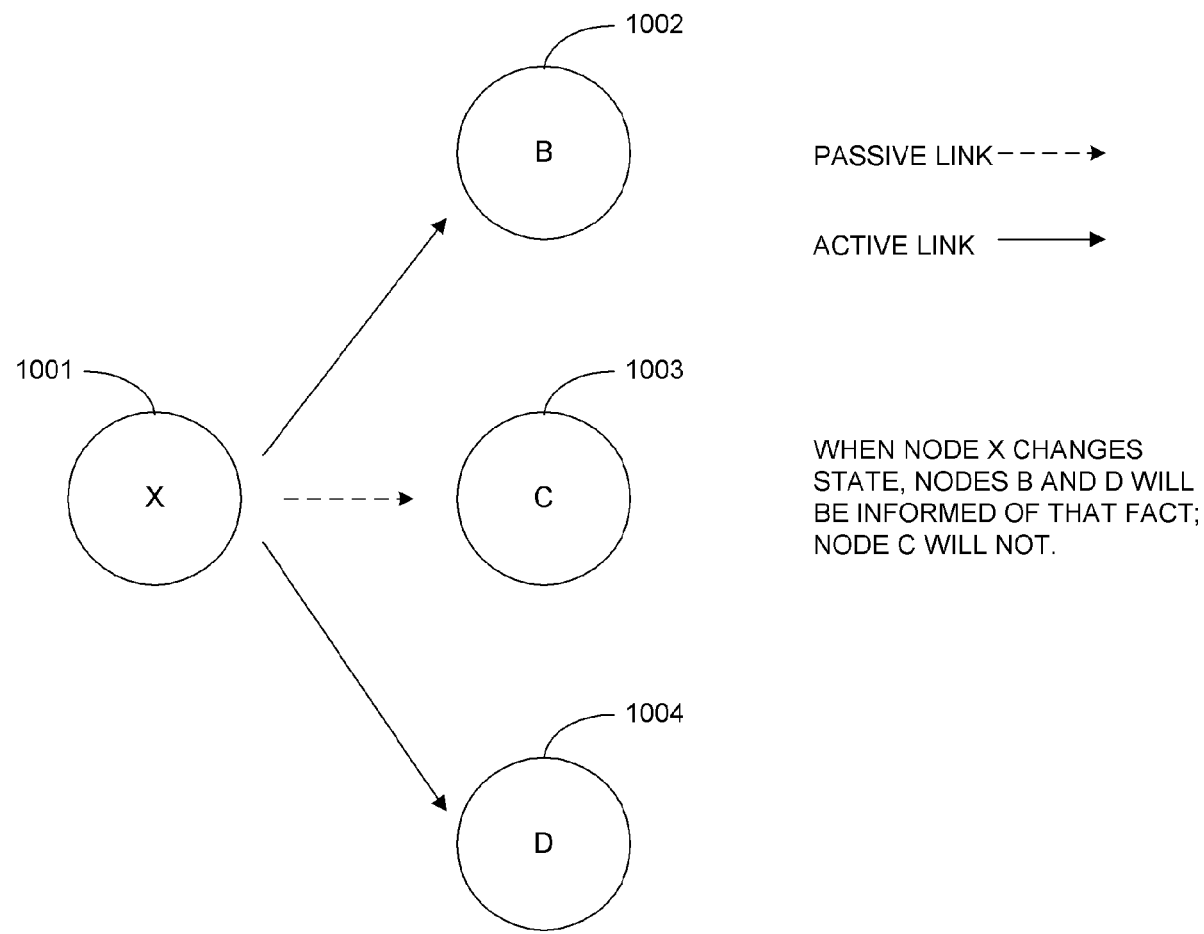
FIG. 10A is a high-level block diagram illustrating the approach of the present invention for implementation of activation and passivation of nodes and links.

Additionally, Boolean Networks support the activation and passivation of nodes and links. FIG. 10A is a high-level block diagram illustrating the approach of the present invention for implementation of activation and passivation of nodes and links using the Boolean Network. An "active link" informs its destination node of any changes in its source node's state. A "passive link" does not inform its destination node of any changes in its source node's state. As illustrated at FIG. 10A, when node X 1001 changes state, nodes B 1002 and D 1004 will be informed (i.e., nodes connected by active links), whereas node C 1003 will not be informed (i.e., node connected by passive link).

An "active node" is a node which has one or more active output links and/or observers. Since decision nodes by definition have observers, they are always active. A "passive node" is a node which has no active output links. Passive nodes are essentially turned off because no rules depend upon their value. An "active transducer" has active output links and/or observers. A "passive transducer" has no active output links and no observers. Passive transducers do not need to evaluate until one of their outputs becomes active. A node is "pending" if it is active and has not yet evaluated to true.

The methodology of the present invention provides for incorporating the use of passive links in the Boolean Network rule engine. The motivation for using passive links is that it significantly increases the efficiency of the system by substantially reducing expensive broadcasts. For example, consider the case where a network computes the following set of rules:

A=1&B=1&ID=1
A=1&B=1&ID=2
A=1&B=1&ID=3
A=1&B=1&ID=4
A=1&B=1&ID=5
A=1&B=1&ID=6

Figure 10B:
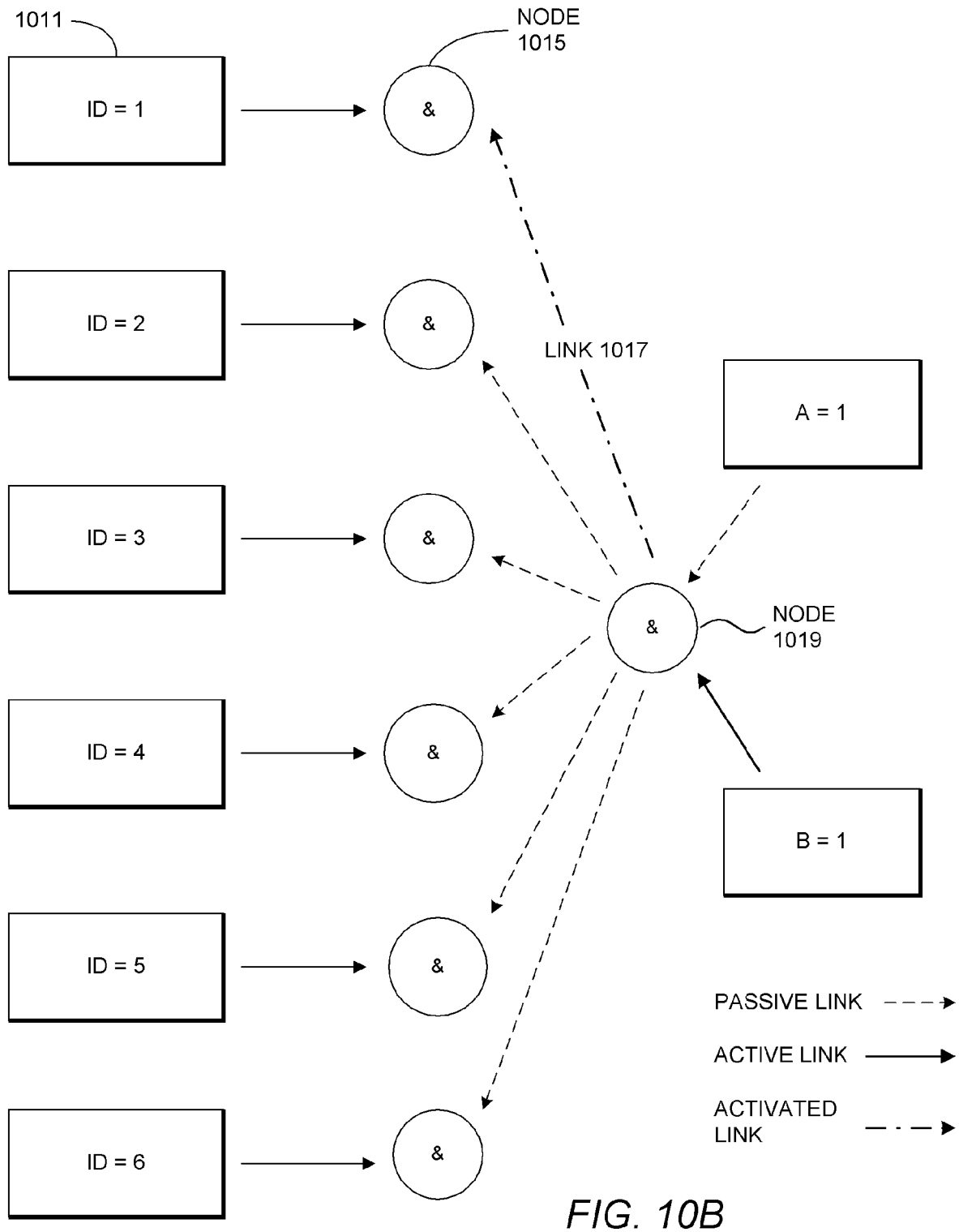
FIG. 10B is a block diagram illustrating the use of passive links.

When A=1&B=1 is TRUE, six nodes need to be informed of that fact. This is troubling because at most one of the above expressions will evaluate to TRUE. Passive links greatly reduce inefficient activity in a network of this kind. FIG. 10B is a block diagram illustrating a more efficient system that provides for the use of passive links. For example, consider an input arrives with ID=1, A=1, and B=1. Since ID=1 at 1011 Node 1015 activates Link 1017. When Node 1019 becomes TRUE, it only needs to notify Node 1015 because Link 1017 is the only active link coming from Node 1019.

Figure 10C:
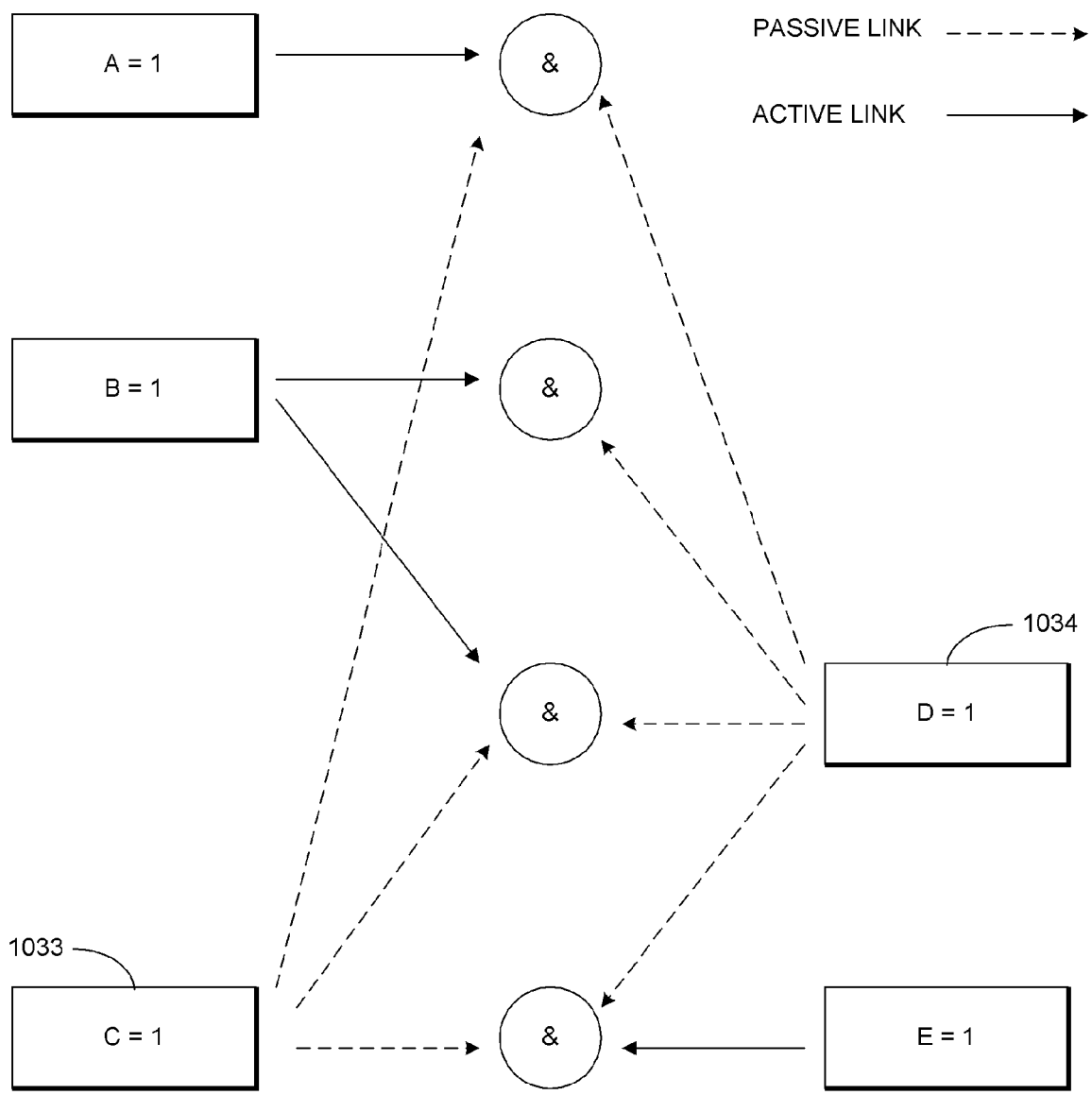
FIG. 10C is a block diagram illustrating an example of the activation process in the Boolean Network rule engine.

In the Boolean Network rule engine the activation process can be generally described as follows. Initially, an active AND node has a single active input link. The active input link is chosen based upon the link's passivation weight. The input link with the lowest passivation weight is chosen for activation. A link's initial passivation weight is assigned at design time and is based on the link's source output count. Passive links reduce the unnecessary broadcast of state changes through the network. For this reason links with low source output counts are activated before links with high source output counts. It seems reasonable that nodes which have fewer output links fire less often than nodes with many output links (although this is not always the case). Therefore, links with low source output counts are good candidates for activation. FIG. 10C is a block diagram illustrating an example of the activation process in the Boolean Network rule engine. FIG. 10C depicts the initial state of a network that contains four decision nodes. Note that the C=1 and D=1 transducers (i.e., transducers 1033, 1034) have no active output links. These transducers 1033, 1034 do not need to evaluate until one of their output links becomes active.

The "true count" associated with an active AND node in the current embodiment of the present invention relates to the number of active input links as follows: (1) if the node has already evaluated to TRUE, the true count equals the number of active input links; (2) if the active AND node has not evaluated to TRUE, the node's true count equals the number of active links minus one; (3) when an active AND node receives a TRUE notification from an active input link, it increments its true count and then activates the passive input link with the lowest passivation weight (note that an active link does not provide two consecutive TRUE notifications because the network nodes propagate only state changes); and (4) when an active AND node receives a FALSE notification from an active input link, it decrements its true count, passivates the input link that gave the FALSE notification, and activates the passive input link with the lowest source output count. Input links to a pending OR node are all active.

The approach of the present invention provides for a link to be passivated when its source node's output changes from TRUE to FALSE. A link may also be passivated if its source node's value is of no consequence to the network's observers. If a node has no active output links and no observers, all of its input links should be passive. If all the inputs to a node are passive, the node itself is passive and vice versa. A node with no active output links and no observers is passive. Initially all the inputs to an active OR node are active. When an OR node receives a TRUE notification, all the remaining inputs (i.e., the ones that did not notify TRUE) may be passivated.

Transducers without active output links (i.e., "lazy transducers") need not evaluate. A benefit of the current invention is that the evaluation of a transducer is delayed until one of its output links is activated. Transducer evaluations are expensive. The current embodiment of the Boolean Network rule engine provides for this potentially very powerful optimization because it reduces the number of transducer evaluations.

The present invention also provides for dynamic passivation weight assignment. Passivation weights can be changed at runtime to better reflect the runtime behavior of a system. Nodes that broadcast the least should have the lowest passivation weight. Basing a link's passivation weight on the output count of its source node is a beneficial starting point, and further optimization may be possible based upon observed trends in the Boolean Network system.

Figure 11A:
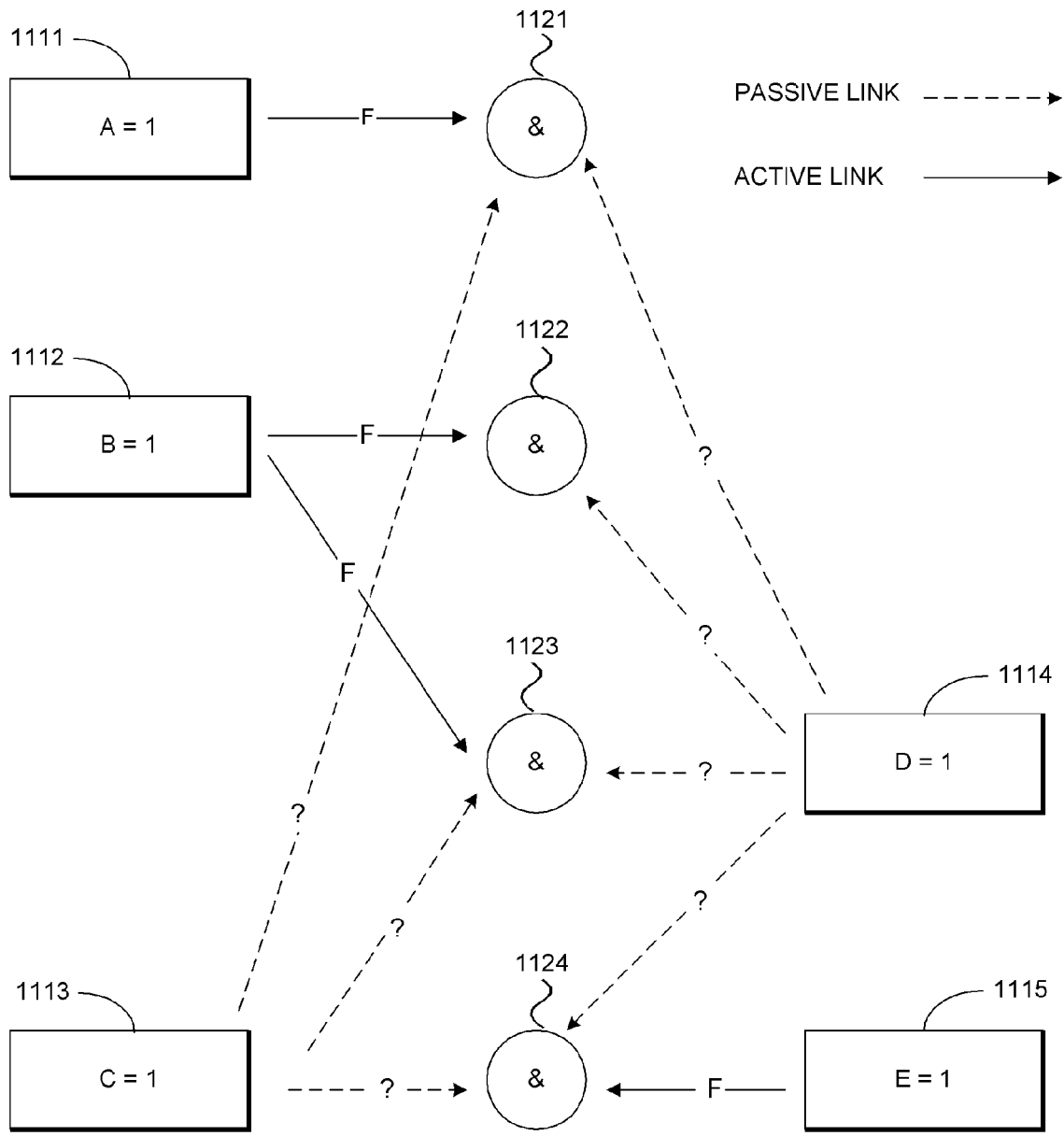
FIGS. 11A-D are a set of state diagrams illustrating how the state of a network changes as new inputs are introduced over time.

FIGS. 11A-D are a set of state diagrams illustrating how the state of a network changes as new inputs are introduced over time. FIG. 11A illustrates an initial network state. At FIG. 11A all transducer outputs are FALSE (indicated by an F) or unknown (indicated by a ? symbol). Also, the links originating from nodes 1111, 1112, and 1115 are active, while the links originated from nodes 1113 and 1114 are passivated. Note that the links that are initially active are the links with a lower source output count.

Figure 11B:
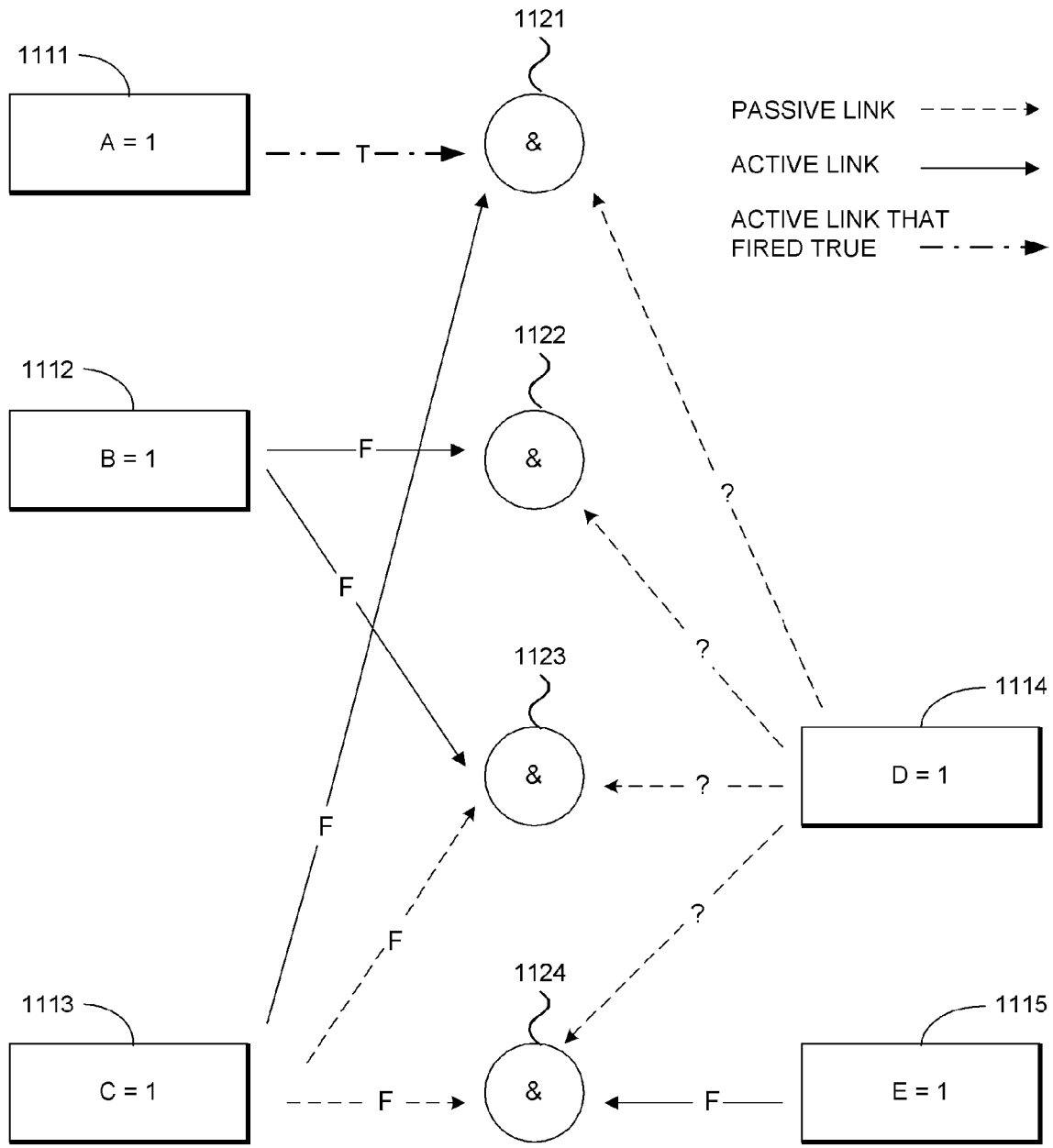

At FIG. 11B an input arrives with A=1, B=0, C=0, D=1, E=0. As shown, the active link from node 1111 to node 1121 fires TRUE based on the input (i.e., based on A=1). In response, the link from transducer 1113 (C=1) to node 1121 is activated as shown at FIG. 11B.

Figure 11C:
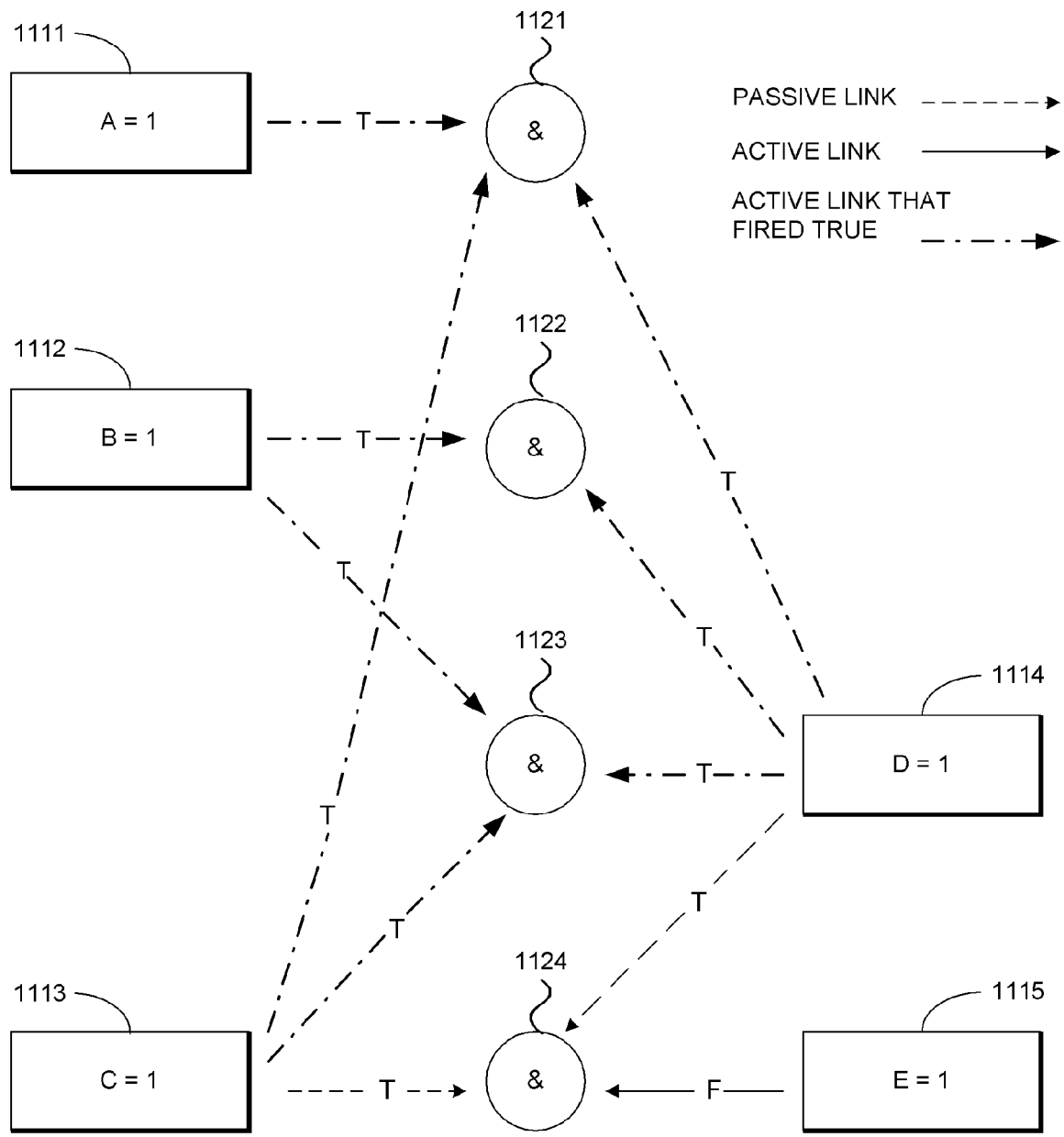

At FIG. 11C an input arrives with A=1, B=1, C=1. The active links from nodes 1111, 1112, and 1113 fire TRUE as shown at FIG. 1C. Also, the links from node 1114 to nodes 1121, 1122, and 1123 are activated based on these active links firing TRUE. Nodes 1121, 1122, and 1123 hit (i.e., these AND logic gates are satisfied) as all inputs are TRUE. Also note in this case that the D=1 fact is recalled from the previous input (i.e., as shown at FIG. 11B).

Figure 11D:
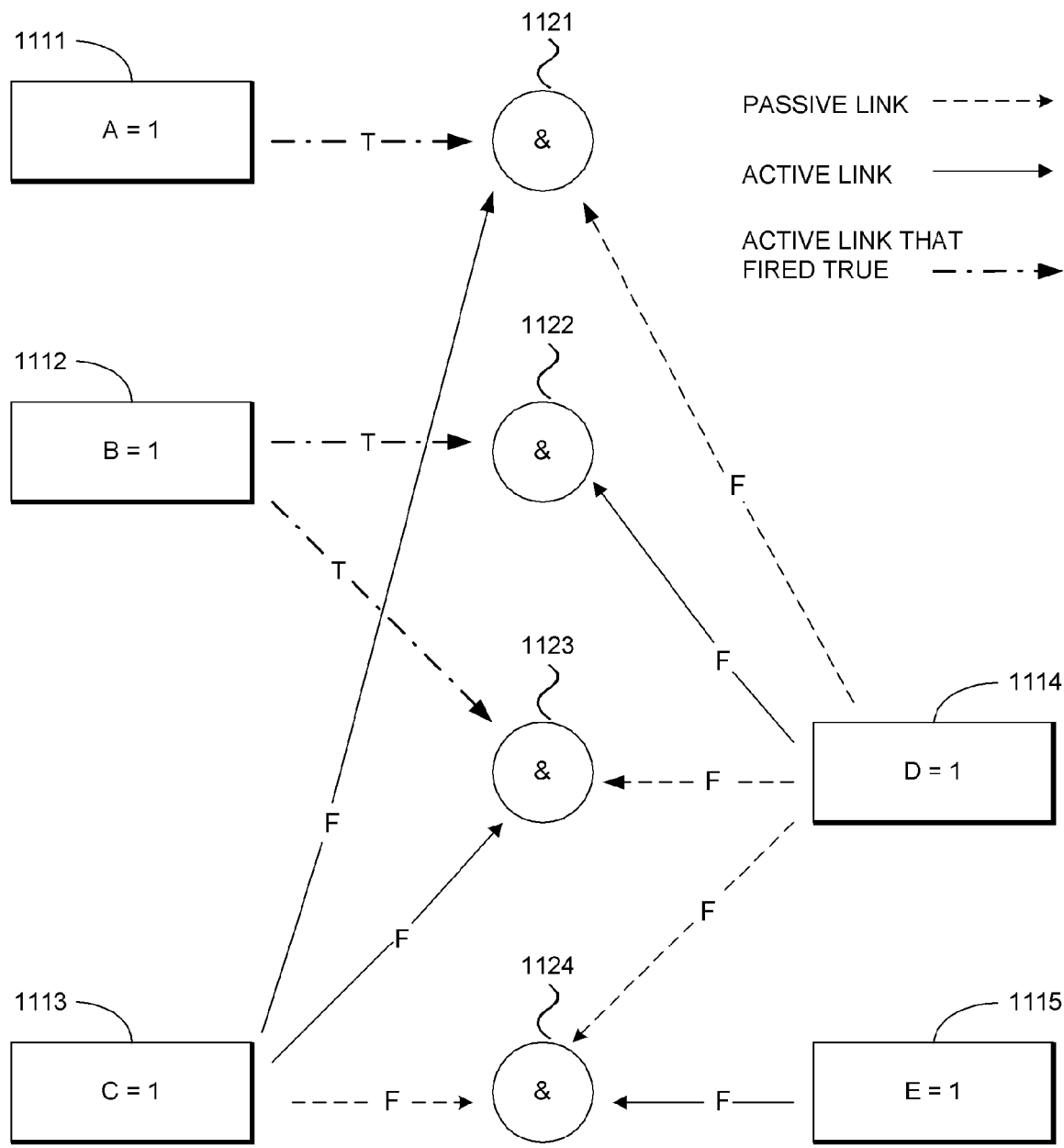

At FIG. 11D an input arrives with C=0, D=0. The active links from node 1111 (A=1) and node 1112 (B=1) continue to fire TRUE. However none of nodes 1121-1124 hit as one or more inputs to each of these AND logic gates is FALSE.

Passivation, Activation, and Propagation of Values at Runtime

Figure 12A:
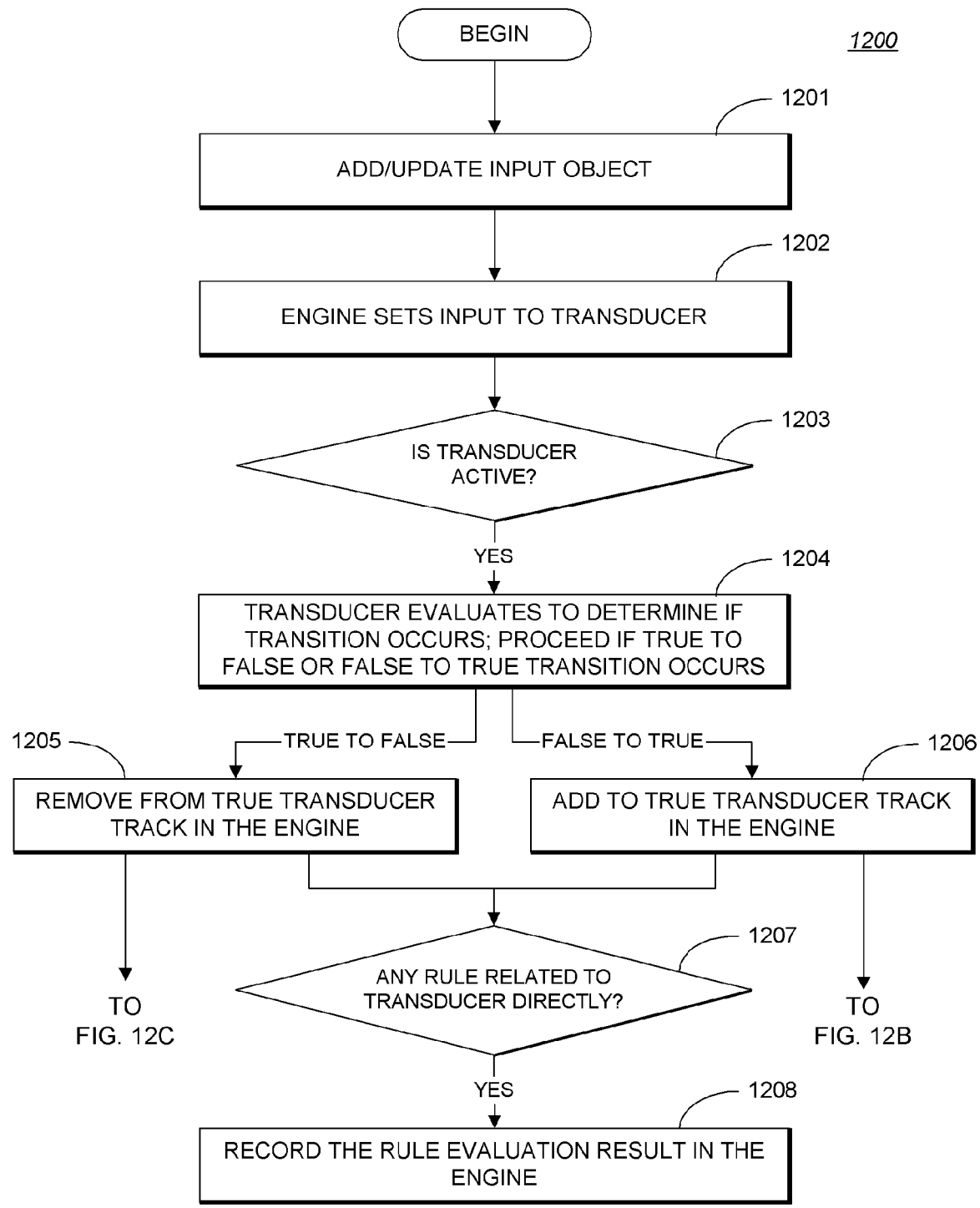
FIGS. 12A-C comprise a single flow diagram illustrating the methodology of the present invention for passivation and activation of links and the propagation of values through the Boolean Network at runtime.
Figure 12B:
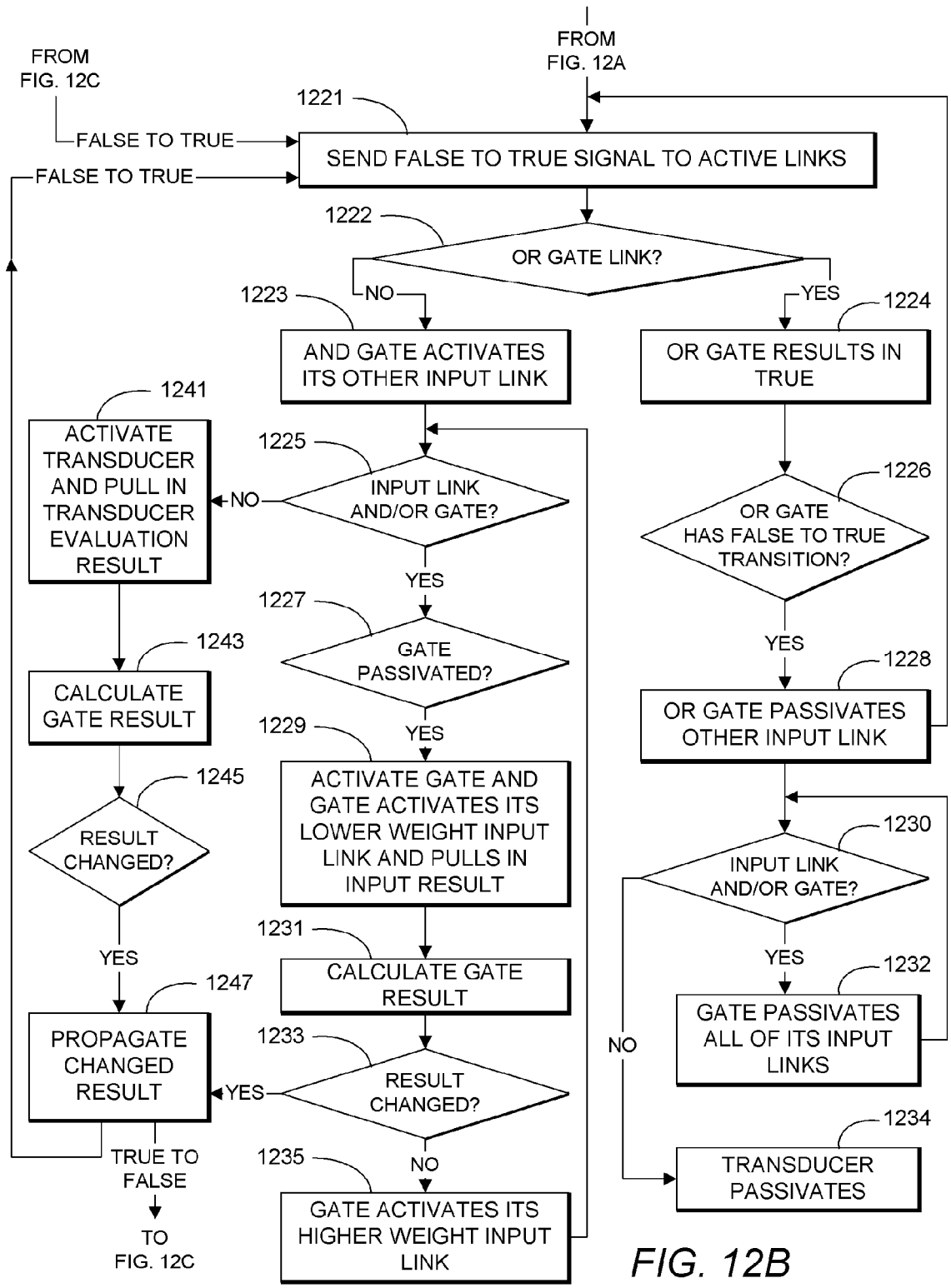
Figure 12C:
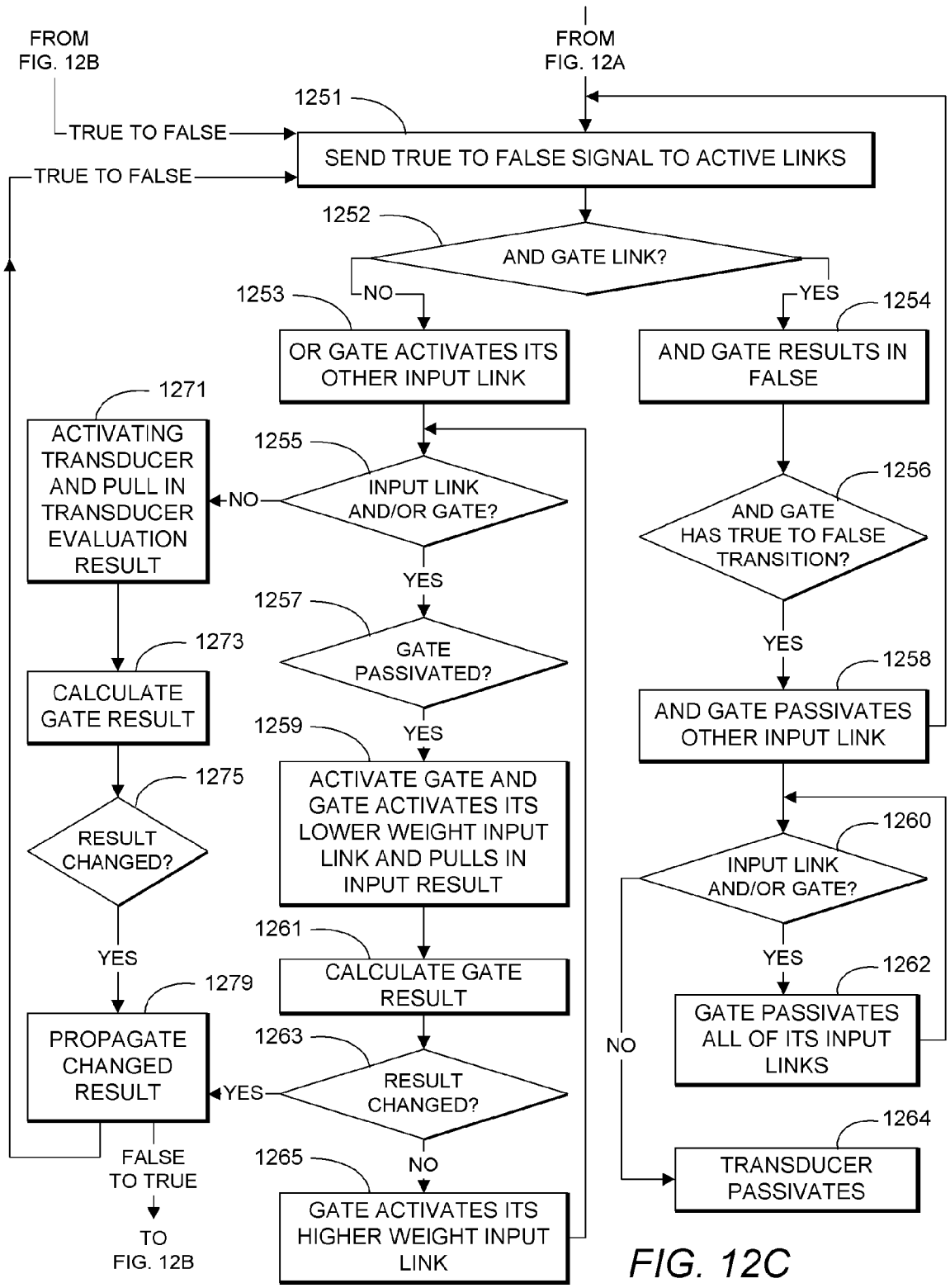

FIGS. 12A-C comprise a single flow diagram 1200 illustrating the methodology of the present invention for passivation and activation of links and the propagation of values through the Boolean Network at runtime. Although the following describes several of the operations of the present invention during evaluation of rules at runtime, certain other aspects are described separately. For example, the evaluation of related transducer bundles is described separately. Similarly, other operations performed during the deployment phase are also separately described. It should be noted that the following discussion describes a particular Boolean Network implementation constructed in accordance with the currently preferred embodiment of the present invention. Those skilled in the art will appreciate that certain changes and variations may be made. Accordingly, the following is for purposes of illustration and not limitation.

At the outset it is assumed that the deployment phase has been completed and a Boolean Network has been constructed to represent a ruleset. The following describes the runtime behavior of the system in the evaluation of rules. At 1201, the process starts with the addition of a new input object or the updating of an existing input object (i.e., with the presentation of input to the Boolean Network). An input could, for example, be a string, an integer, or any kind of object received via the system's JSR 94 interface. There are a number of different types of objects that are supported by the system in its currently preferred embodiment.

At 1202, the engine sets the input to a transducer. The mapping from input to transducer is defined during the deployment phase. Thus, sending the input to the appropriate transducer is a quick operation at runtime. At 1203, the first determination that is made is whether or not the transducer is active. Recall that transducers (and gates) may be either active or passive. If the transducer is passivated, the network deems the input not to be significant (at least at the present time) to the rule outcome and activity ceases at that point. The input is, however, maintained (i.e., held on to) as it may subsequently become significant if the transducer is activated at a later point in time. On the other hand, if the transducer is active, the transducer evaluates the input at 1204. As shown, if the transducer is active, the input is evaluated to determine if a transition has occurred. The Boolean Network is concerned with transitions of Boolean values. Specifically, the system responds to transitions from TRUE to FALSE and transitions from FALSE to TRUE. The process flow branches at 1204 based on whether there is a transition and the type of transition that occurs (TRUE to FALSE to 1205 and FALSE to TRUE to 1206). It should be noted that if no transition occurs at 1204, then there is no further activity. For example, if the transducer previously evaluated to FALSE and it remains FALSE, then activity ceases at this point as there is no transition.

Assume that in a particular instance a transition occurs and the transition is from FALSE to TRUE. Accordingly, the process proceeds to 1206. (Note that a transition from TRUE to FALSE proceeds to 1205 in which case the transducer is removed from the true transducer track (list) in the engine). Based on the FALSE to TRUE transition, the transducer is added to a true transducer track (list) in the engine at 1206. The reason for adding the transducer to this list has to do with reinitializing the network after an evaluation. This is an optimization for ease of reinitialization and is not fundamental to the operations of the present invention. Next, assume that a FALSE to TRUE transition has occurred, the process goes to 1221 at FIG. 12B in response to the FALSE to TRUE transition.

It should be noted that in some cases a rule may relate directly to the transducer as provided at 1207. For example, a rule may consist entirely of the evaluation of a single transducer. If this is the case, then the rule evaluation result is recorded in the engine as shown at 1208 at FIG. 12A. There is no further evaluation required for that particular rule. However, if a FALSE to TRUE transition has accurred and the rule does not directly relate to a particular transducer, the method proceeds to 1221 at FIG. 12B.

At 1221, the FALSE to TRUE signal is sent to all of the active links of the transducer. A given transducer may have a number of links emanating from it, some of which are active and some of which are passivated (as previously described and as illustrated at FIGS. 11A-D). Only the active links receive a notification of the change as provided at 1221 at FIG. 12B.

At 1222, a determination is made as to whether a target of those links is an OR gate or an AND gate. The flow diverges at 1222 based on whether it is an OR gate or an AND gate. Assume initially that it is an OR gate. In this event the process proceeds to 1224. As shown, if the target of the link is an OR gate, the OR gate results in a TRUE value at 1224. This is the case as TRUE is being input to an OR gate. At 1226 a determination is made as to whether a FALSE to TRUE transition has occurred at the OR gate. It is possible that the OR gate output is already TRUE. If this is the case, then no transition has occurred and activity ceases at this point (i.e., at 1226 at FIG. 12B).

On the other hand, if the OR gate was not already TRUE at 1226, then a transition has occurred that needs to be further propagated through the network. If a transition has occurred, the OR gate then passivates the other input link at 1228. The processing of passivating the other input link is illustrated at 1230, 1232, 1234 at FIG. 12B. This can be seen as a sort of compound operation. As shown at 1230, a determination is made as to whether the input link is attached to an AND gate or an OR gate. If it is not attached to an AND gate or an OR gate then it is attached to a transducer. If this is the case, the transducer is passivated at 1234. However, if the input link is attached to an AND gate or an OR gate at 1230, then at 1232 the gate will passivate all of its input links. The process then proceeds back to 1230 for processing these input links.

Once the passivation of the input links is complete, the process returns from 1228 to the top of FIG. 12B to repeat the process. This involves the propagation to the next gate. Recall that the OR gate has experienced a FALSE to TRUE transition. After the inputs to this OR gate are passivated, this FALSE to TRUE transition is propagated to the next level. The operations described above and illustrated commencing at 1221 at FIG. 12B are then repeated in the same manner that the transducer's FALSE to TRUE transition was propagated through the Boolean Network.

At 1222, a determination is made as to whether the next gate is an OR gate or an AND gate. Assume in this instance that the next gate is an AND gate (not an OR gate). If this is the case, the process proceeds to 1223 to activate other input links of the AND gate. Note that the AND gate has experienced a FALSE to TRUE transition in one of its input links. Consequently, its other input(s) become interesting for purposes of evaluating the rule. For example, assume that a given AND gate has two input links. If the first gate transitions from FALSE to TRUE, the second gate becomes interesting because it takes two positive inputs to the AND gate to produce a TRUE result.

At 1225 it is determined whether the other input is an AND gate, an OR gate, or a transducer. The process branches at this point based on whether the input is a logic gate or a transducer. If it is determined that the other input is an AND or an OR gate at 1225, then a determination is made as to whether or not the AND/OR gate is passivated at 1227. If it is passivated, then the gate and its inputs must be activated at 1229. This implies that at least one of its inputs should also be activated. When a gate is passivated, both of its inputs are passivated. When the gate is activated, then at least one of its inputs is activated. As shown at 1229 at FIG. 12B, when activated the gate activates its lower weight input link and pulls in the input result. Note that if two links are inactive, the lower weight input link is activated first and the higher weight input link is activated second. In the currently preferred embodiment, the weighting is structured as a passivation weighting. Accordingly, the weighting is assigned from the perspective of passivating gates—where the passivation weight indicates the desirability of passivating a particular input. In general, the lower weight link causes a lesser amount of activity in the network. Given that a result can often be determined by activating and examining only one input link, activating the link that causes a lesser amount of network activity can serve to improve system performance. For instance, fewer inputs may need to be evaluated.

The evaluation of one input may be sufficient to produce a change (e.g., a transition from FALSE to TRUE). Alternatively, the evaluation of one input may not yet be sufficient. Accordingly, the result at the gate is calculated at 1231 and the result is evaluated at 1233. If the gate result has changed at 1233, then the changed result is propagated as provided at 1247. The change may be a change from FALSE to TRUE or from TRUE to FALSE. If the change is from FALSE to TRUE, the result is propagated back to 1221 at FIG. 12B. However, if the gate result changes from TRUE to FALSE, the result is propagated to 1251 at FIG. 12C.

If the gate result has not changed at 1233, then the other (higher weight) input link of the gate is activated at 1235. In this case, the flow proceeds back to 1225 to evaluate the new input link. Specifically, it is determined whether the new input is and AND or an OR gate (i.e., a logic gate) at 1225. Assume in this case that it is a transducer. If this is the case, the process proceeds to 1241 to activate the transducer.

At 1241 at FIG. 12B, the transducer is activated and pulls in the transducer evaluation result. In other words, the transducer is activated and the result is computed. The output of the gate fed by the transducer is then calculated at 1243. If the gate result is changed at 1245, then the result is propagated as shown at 1247. As previously described, the process branches at 1247 based on whether the transition is from FALSE to TRUE or from TRUE to FALSE. The result diverges based on the type of transition that has occurred in the same way as this originally diverged at 1204 at FIG. 12A. The transition is then sent either to 1221 at FIG. 12B (FALSE to TRUE) or to 1251 at FIG. 12C (TRUE to FALSE).

FIG. 12C is substantially similar to FIG. 12B, except the AND gate and the OR gates are switched as the signal has switched. The process illustrated at FIG. 12C is similar to that shown at FIG. 12B, but because the transition is from TRUE to FALSE, the input to an AND gate results in a FALSE result from the AND gate (e.g., as shown at 1254 at FIG. 12C).

Class Descriptions

In the currently preferred embodiment of the present invention, a user may specify what kind of approach they want the Boolean Network rule engine to operate on through the properties they set with the ruleset and the key and values as defined in BNRuleConstants, for example:

Key:
APPROACH
Values:
APPROACH_BASIC_TWO_INPUTS
APPROACH_SMART_TWO_INPUTS

A user may specify the locale and date time style they want the Boolean Network rule engine to do I18N/L10N on through the properties they set with the ruleset and key, as defined in BNRuleConstants:

Key:
LOCALE
DATETIME_STYLE

The value for LOCALE should be a Locale class instance. The value for DATETIME_STYLE should be the integer values defined in class DateFormat.

Boolean Network RuleML classes are used to store the RuleML_BN information, which include BNRuleMLAtom, BNRuleMLConst, BNRuleMLFun, BNRuleMLHead, BNRuleMLInd, BNRuleMLIndArray, BNRuleMLNode, BNRuleMLOp, BNRuleMLOpf, BNRuleMLOpr, BNRuleMLRel, and BNRuleMLVar.

Boolean Network node factory classes are for creating the Boolean Network based on the configuration user set through the properties. Boolean Network node factory classes include BNBasicTwoInputFactory and BNSmartTwoInputFactory.

Boolean Network input classes are used to define the input objects feeding to the Boolean Network. Class BNInput is an abstract class that serves as a base class for all input classes for the Boolean Network.

Class BNRuleSetInput is an abstract class which extends class BNInput and serves as a base class for all ruleset input classes. The ruleset input classes are for a user to specify an input that applies to all the rules, and the individual rule input will be pulled from the ruleset input. Class BNRuleSetResolvedInput extends BNRuleSetInput and defines the methods all resolver input classes need to use or need to overload. Currently, BNXPathResolver is for a user to specify a DOM input using XPATH to resolve the individual input values.

Class BNRuleInput is an abstract class which extends class BNInput and serves as a base class for all rule input classes. The rule input classes are for a user to specify an input that applies to some rule(s). For these kind of input classes a user does not need to specify the rule handles since the variable name stored in the class automatically makes the connection to the related rules. Class BNVarDirectInput is an abstract class which extends class BNRuleInput and serves as a base class for all the input classes tying to the variable directly. The variable direct input classes include BNVarBooleanDirectInput, BNVarByteDirectInput, BNVarCharDirectInput, BNVarShortDirectInput, BNVarIntDirectInput, BNVarLongDirectInput, BNVarFloatDirectInput, BNVarDoubleDirectInput, BNVarStringDirectInput, BNVarCalendarDirectInput, BNVarDOMDirectInput, BNVarArrayDirectInput, and BNVarObjectDirectInput. All variable direct input classes are specifically for variable input, so a user needs to set both the variable name and value. BNVarObjectDirectInput is not recommended for a user to use when the user knows the input type.

Class BNVarPropertyInput is also a BNRuleInput. It enables the Boolean Network rule engine to pull out the value of the variable from the properties that are set with the ruleset or with the rule. In this instance a user has to set the rule handle and the property key name. If the rule handle is not set, the Boolean Network rule engine automatically tries to find the property from the properties for the ruleset. Class BNVarsInput is a class in which a user may input groups of BNVarDirectInput and BNVarPropertyInput instances together. A user needs to be aware that when using this class each input turns into an object, consequently the rule engine will spend time recognizing the real type later.

Boolean Network output classes are used to define the output objects returned by the Boolean Network. Class BNBooleanOutput is used for the Boolean output related to a rule. It specifies the rule handle and the result value in Boolean. Class BNConclusionOutputis used for the conclusion output related to a rule, which means in RuleML there is a <head> . . . </head> section defined inside the rule. BNConclusionOutput specifies the rule handle, the Boolean result value, and a structure representing the content defined inside the <head> . . . </head> section in RuleML.

BNRuleExecutionSet is responsible to instantiate the instance of BNRuleMLToBN by passing in the ruleset and its properties. BNRuleMLToBN is responsible to build the Boolean Network structure (class BNStructure). BNEngine has a reference to BNStructure to access the Boolean Network structure. BNRuleMLToBN instance is registered with BNRuleExecutionSetso that the Boolean Network structure only needs to be built once.

Class BNStructure holds all of the structure of the Boolean Network. The reference to the engine (class BNEngine) is set when the engine is instantiated by the rule session.

Class BNEngine is responsible for the following:

To set the engine reference into a Boolean network structure (class BNStructure);

To create and track the handles for all input objects;

To properly construct the input objects for the transducers from the input objects a user sets in;

To find the proper transducers to set the input object to;

To keep track of the transducer fire lists and the rule result lists;

To fire the transducers when executeRules() is called;

To properly construct the output objects with filters or without filters;

To perform reset on proper transducers if STATELESS mode is required.

Boolean Network node classes serve as base classes of Boolean Network transducer classes and gate classes. The BN node classes include BNBasicNode, BNBasicNodeFactory, and BNNodeFactory.

Boolean Network transducer classes handle transducer logic. These classes include BNBasicOpfTransducer, BNBasicOprTransducer, BNBasicTransducer, BNBundledOprTransducers, BNOpfTransducer, BNOpfTransducerComponent, BNOprTransducer, BNOprTransducerComponent, BNSmartOpfTransducer, BNSmartOprTransducer, BNSmartTransducer, BNTransducer, BNTransducerComponent, and BNTransducerHelper.

Boolean Network gate classes are for handling both AND and OR gate logic. These classes include BNANDGate, BNBasicANDGate, BNBasicGate, BNBasicORGate, BNBasicTwoInputANDGate, BNBasicTwoInputGate, BNBasicTwoInputORGate, BNBasicTwoInputNodeFactory, BNORGate, BNSmartANDGate, BNSmartGate, BNSmartNode, BNSmartNodeFactory, BNSmartORGate, BNSmartTwoInputANDGate, BNSmartTwoInputNodeFactory, and BNSmartTwoInputORGate.

Boolean Network evaluator interfaces and implementation classes are for simple and functional evaluations. These classes build the extensible evaluators used by transducers.

The simple evaluator interfaces and implementation classes are for handling simple evaluations on all kinds of data types. These interfaces and classes include ISEArraySimpleEvaluator, ISEBooleanSimpleEvaluator, ISEByteSimpleEvaluator, ISECalendarSimpleEvaluator, ISECharacterSimpleEvaluator, ISEDOMSimpleEvaluator, ISEDoubleSimpleEvaluator, ISEFloatSimpleEvaluator, ISEIntegerSimpleEvaluator, ISELongSimpleEvaluator, ISEShortSimpleEvaluator, ISESimpleEvaluator, ISESimpleEvaluatorFactory, ISESTringSimpleEvaluator, SEAbstractSimpleEvaluator, SEArrayObjectSimpleEvaluator, SEBooleanSimpleEvaluator, SEByteSimpleEvaluator, SECalendarSimpleEvaluator, SECharacterSimpleEvaluator, SEDOMSimpleEvaluator, SEDoubleSimpleEvaluator, SEFloatSimpleEvaluator, SEIntegerSimpleEvaluator, SELongSimpleEvaluator, SEShortSimpleEvaluator, SESimpleEvaluator Constant, SESimpleEvaluatorFactory, SESimpleEvaluator Helper, and SEStringSimpleEvaluator. A user is also able to provide their own implementations for the interfaces (e.g., provide their own implementations for the simple evaluations).

The function evaluator classes are for functional evaluations. The supported functional evaluations are average evaluation (by class FEAVGEvaluator), length evaluation (by class FELENEvaluator), last item of array evaluation (by class FELSTEvaluator), maximum evaluation (by class FEMAXEvaluator), minimum evaluation (by FEMINEvaluator), sub-string evaluation (by class RESUBSTREvaluator), and sum evaluation (by class FESUMEvaluator).

BN exception classes are defined in ClassDiagram_BN_Exception. Specific exception classes are BNException, which extends Exception. These exception classes are converted to JSR 94 supported exceptions later.

The following is the XML schema definition (XSD) for RuleML like metadata (RuleML_BN.xsd) utilized in the currently preferred embodiment of the present invention:

```
1: <?xml version="1.0" encoding="UTF-8"?>
2: <!-- An XML Schema for rule based on ruleML0.8, rule ML current rule design, and ruleml_eai_02.xsd -->
3: <!-- Last Modification: 2003-01-24-->
4: <xsd:schema xmlns:xsd="http://www.w3.org/2001/XMLSchema">
5: <!-- Top-level element Declaration -->
6: <!-- 'rulebase' root element uses 'react' rules, 'trans" rule, "imp" rule, 'fact' rule, "query" rule, and "ic" rule assertions as top-level elements -->
7: <xsd:element name="rulebase">
8: <xsd:complexType>
9: <xsd:choice minOccurs="0" maxOccurs="unbounded">
10: <xsd:element name="react" type="reactType"/>
11: <xsd:element name="trans" type="transType"/>
12: <xsd:element name="imp" type="impType"/>
13: <xsd:element name="fact" type="factType"/>
14: <xsd:element name="query" type="queryType"/>
15: <xsd:element name="ic" type="icType"/>
16: <:/xsd:choice>
17: </xsd:complexType>
18: </xsd:element>
19: <!-- complexType Definitions -->
20: <!-- "react" assertions are describing event-condition-action rules -->
21: <!-- "react" element uses "event", "_body", and "_head" -->
22: <!-- "event" is event, "_body" is condition, and "_head" is action -->
23: <!-- NOTE this is a guess made based on RuleML current rule design -->
24: <xsd:complexType name="reactType">
25: <xsd:all>
26: <xsd:element name="event" type="eventType"/>
27: <xsd:element name="_body" type="bodyType"/>
28: <xsd:element name="_head" type="headType"/>
29: <xsd:all>
30:     <xsd:anyAttribute    namespace="##any" processContents="lax"/>
31: </xsd:complexType>
32: <!-- "trans" assertions are describing functional-equation rules -->
33: <!-- "trans" element uses "_foot", "_body", and "_head" -->
34: <!-- "foot" is value, "_body" is condition, and "_head" is conclusion --->
35: <!-- NOTE this is a guess made based on RuleML current rule design -->
36: <xsd:complexType name="transType">
37: <xsd:all>
38: <xsd:element name="_foot" type="_footType"/>
39: <xsd:element name="_body" type="_bodyType"/>
40: <xsd:element name="_head" type="_headType"/>
41: </xsd:all>
42:     <xsd:anyAttribute    namespace="##any" processContents="lax"/>
43: </xsd:complexType>
44: <!-- 'imp' assertions are describing implications-inference rules -->
45: <!-- 'imp' element uses "_head" and "_body" -->
46: <!-- "_body" is condition, and "_head" is conlusion -->
47: <xsd:complexType name="impType">
48: <xsd:all>
49: <xsd:element name="_body" type="_bodyType"/>
50: <xsd:element name="_head" type="_headType"/>
51: </xsd:all>
52:     <xsd:anyAttribute    namespace="##any" processContents="lax"/>
53: </xsd:complexType>
54: <!-- 'fact' assertions are usable as degenerate rules on the top-level -->
55: <!-- 'fact' element uses just a conclusion role _head -->
56: <!-- "<fact>-head</fact>" stands for "_head is implied by true", i.e., "_head is true" -->
57: <xsd:complexType name="factType">
58: <xsd:sequence>
59: <xsd:element name="_head" type="_headType"/>
60: </xsd:sequence>
61: </xsd:complexType>
62: <!-- 'query' assertions are describing 'conclusionless' derivation rules-->
63: <!-- 'query' element uses just "_body" -->
64: <!-- "_body" is ??? -->
65: <!-- NOTE this is a guess made based on RuleML current rule design -->
66: <xsd:complexType name="queryType">
67: <xsd:sequence>
68: <xsd:element name="_body" type="_bodyType"/>
69: </xsd:sequence>
70: </xsd:complexType>
71: <!-- 'ic' assertions are describing consistency-maintenance rules-->
72: <!-- 'ic' element uses just "_body" -->
73: <!-- "_-body" is ??? -->
74: <!-- NOTE this is a guess made based on RuleML current rule design -->
75: <xsd:complexType name="icType">
76: <xsd:sequence>
77: <xsd:element name="_body" type="_bodyType"/>
78: </xsd:sequence>
79: </xsd:complexType>
80: <!-- NOTE this is a guess, got it from ruleml_eai_02.xsd -->
81: <xsd:complexType name="eventType">
82: <xsd:sequence>
83: <xsd:element name="atom" type="atomType"/>
```

```
84: </xsd:sequence>
85:     <xsd:anyAttribute namespace="##any" processContents="lax"/>
86: </xsd:complexType>
87: <!-- _body role is usable within 'imp' rules -->
88: <!-- _body uses an atomic formula or an 'and' -->
89: <!-- NOTE or is introduced here by ruleml_eai__02.xsd, and it was also made by a guess for futer RuleML -->
90: <xsd:complexType name="_bodyType">
91: <xsd:choice>
92: <xsd:element name="atom" type="atomType"/>
93: <xsd:element name="and" type="andType"/>
94: <xsd:element name="or" type="orType"/>
95: </xsd:choice>
96:     <xsd:anyAttribute namespace="##any" processContents="lax"/>
97: </xsd:complexType>
98: <!-- -head uses an atomic formula -->
99: <xsd:complexType name="_headType">
100: <xsd:sequence>
101: <xsd:element name="atom" type="atomType"/>
102: </xsd:sequence>
103:    <xsd:anyAttribute namespace="##any" processContents="lax"/>
104: </xsd:complexType>
105: <!-- NOTE this is a pure guess -->
106: <xsd:complexType name="_footType">
107: <xsd:sequence>
108: <xsd:element name="atom" type="atomType"/>
109: </xsd:sequence>
110:    <xsd:anyAttribute namespace="##any" processContents="lax"/>
111: </xsd:complexType>
112: <!-- an 'and' is usable within _body's -->
113: <!-- 'and' uses zero or more atomic formulas -->
114: <!-- "<and>atom</and>" is equivalent to "atom"-->
115: <!-- "<and></and>" is equivalent to "true"-->
116: <!-- NOTE or is introduced here by ruleml_eai__02.xsd, and it was also made by a guess for futer RuleML -->
117: <xsd:complexType name="andType">
118:    <xsd:choice minOccurs="0" maxOccurs="unbounded">
119: <xsd:element name="atom" type="atomType"/>
120: <xsd:element name="or" type="orType"/>
121: </xsd:choice>
122:    <xsd:anyAttribute namespace="##any" processContents="lax"/>
123: </xsd:complexType>
124: <!-- NOTE or is introduced here by ruleml_eai__02.xsd, and it was also made by a guess for futer RuleML -->
125: <xsd:complexType name="orType">
126:    <xsd:choice minOccurs="0" maxOccurs="unbounded">
127: <xsd:element name="atom" type="atomType"/>
128: <xsd:element name="and" type="andType"/>
129: </xsd:choice>
130:    <xsd:anyAttribute namespace="##any" processContents="lax"/>
131: </xsd:complexType>
132: <!-- atom element uses an: -->
133: <!-- _opr ("operator of relations") role followed by a sequence of zero or more arguments, or similarly -->
134: <!-- (since roles constitute unordered elements, and the zero-argument case must not cause ambiguity), -->
135: <!-- a sequence of one or more arguments followed by an _opr role -->
136: <!-- the arguments may be ind(ividual)s or var(iable)s -->
137: <!-- NOTE _opf is introduced here by ruleml_eai__02.xsd, and it was also made by a guess for futer RuleML -->
138: <xsd:complexType name="atomType">
139: <xsd:choice>
140: <xsd:sequence>
141: <xsd:element name="_opr" type="_oprType"/>
142:    <xsd:choice minOccurs="0" maxOccurs="unbounded">
143: <xsd:element name="ind" type="indType"/>
144: <xsd:element name="var" type="varType"/>
145: </xsd:choice>
146: </xsd:sequence>
147: <xsd:sequence>
148: <xsd:choice maxOccurs="unbounded">
149: <xsd:element name="ind" type="indType"/>
150: <xsd:element name="var" type="varType"/>
151: </xsd:choice>
152: <xsd:element name="_opr" type="_oprType"/>
153: </xsd:sequence>
154: <xsd:sequence>
155: <xsd:element name="_opf" type="_opfType"/>
156:    <xsd:choice minOccurs="0" maxOccurs="unbounded">
157: <xsd:element name="ind" type="indType"/>
158: <xsd:element name="var" type="varType"/>
159: </xsd:choice>
160: </xsd:sequence>
161: <xsd:sequence>
162: <xsd:choice maxOccurs="unbounded">
163: <xsd:element name="ind" type="indType"/>
164: <xsd:element name="var" type="varType"/>
165: </xsd:choice>
166: <xsd:element name="_opf" type="_opfType"/>
167: </xsd:sequence>
168: </xsd:choice>
169:    <xsd:anyAttribute namespace="##any" processContents="lax"/>
170: </xsd:complexType>
171: <!-- _opr is usable within atoms -->
172: <!-- _opr uses rel(ation) symbol -->
173: <xsd:complexType name="_oprType">
174: <xsd:sequence>
175: <xsd:element name="rel" type="relType"/>
176: </xsd:sequence>
177:    <xsd:anyAttribute namespace="##any" processContents="lax"/>
178: </xsd:complexType>
179: <xsd:complexType name="_opfType">
180: <xsd:sequence>
181: <xsd:element name="fun" type="funType"/>
182: </xsd:sequence>
183:    <xsd:anyAttribute namespace="##any" processContents="lax"/>
184: </xsd:complexType>
185: <!-- simpleType Definitions -->
186: <!-- there is one kind of fixed argument -->
187: <!-- individual constant, as in predicate logic -->
188: <xsd:complexType name="indType">
189: <xsd:simpleContent>
190: <xsd:extension base="xsd:string">
191:    <xsd:anyAttribute namespace="##any" processContents="lax"/>
192: </xsd:extension>
193: </xsd:simpleContent>
```

```
194: </xsd:complexType>
195: <!-- there is one kind of variable argument -->
196: <!-- logical variable, as in logic programming -->
197: <xsd:complexType name="varType">
198:   <xsd:simpleContent>
199:     <xsd:extension base="xsd:string">
200:       <xsd:anyAttribute namespace="##any" processContents="lax"/>
201:     </xsd:extension>
202:   </xsd:simpleContent>
203: </xsd:complexType>
204: <!-- there are only fixed (first-order) relations -->
205: <!-- relation or predicate symbol -->
206: <xsd:complexType name="relType">
207:   <xsd:simpleContent>
208:     <xsd:extension base="relValueType">
209:       <xsd:anyAttribute namespace="##any" processContents="lax"/>
210:     </xsd:extension>
211:   </xsd:simpleContent>
212: </xsd:complexType>
213: <xsd:complexType name="funType">
214:   <xsd:simpleContent>
215:     <xsd:extension base="xsd:string">
216:       <xsd:anyAttribute namespace="##any" processContents="lax"/>
217:     </xsd:extension>
218:   </xsd:simpleContent>
219: </xsd:complexType>
220: <xsd:simpleType name="relValueType">
221:   <xsd:restriction base="xsd:string">
222:     <xsd:enumeration value="="/>
223:     <xsd:enumeration value="!="/>
224:     <xsd:enumeration value=">"/>
225:     <xsd:enumeration value="<"/>
226:     <xsd:enumeration value=">="/>
227:     <xsd:enumeration value="<="/>
228:     <xsd:enumeration value="contains"/>
229:     <xsd:enumeration value="start with"/>
230:     <xsd:enumeration value="end with"/>
231:     <xsd:enumeration value="equal ignore case"/>
232:     <xsd:enumeration value="not equal ignore case"/>
233:     <xsd:enumeration value="greater than ignore case"/>
234:     <xsd:enumeration value="less than ignore case"/>
235:     <xsd:enumeration value="greater than or equal ignore case"/>
236:     <xsd:enumeration value="less than or equal ignore case"/>
237:     <xsd:enumeration value="contains ignore case"/>
238:     <xsd:enumeration value="start with ignore case"/>
239:     <xsd:enumeration value="end with ignore case"/>
240:     <xsd:enumeration value="before"/>
241:     <xsd:enumeration value="after"/>
242:     <xsd:enumeration value="[*]="/>
243:     <xsd:enumeration value="[*]!="/>
244:     <xsd:enumeration value="[*]>"/>
245:     <xsd:enumeration value="[*]<"/>
246:     <xsd:enumeration value="[*]>="/>
247:     <xsd:enumeration value="[*]<="/>
248:     <xsd:enumeration value="[*]contains"/>
249:     <xsd:enumeration value="[*]start with"/>
250:     <xsd:enumeration value="[*]end with"/>
251:     <xsd:enumeration value="[*]equal ignore case"/>
252:     <xsd:enumeration value="[*]not equal ignore case"/>
253:     <xsd:enumeration value="[*]greater than ignore case"/>
254:     <xsd:enumeration value="[*]less than ignore case"/>
255:     <xsd:enumeration value="[*]greater than or equal ignore case"/>
256:     <xsd:enumeration value="[*]less than or equal ignore case"/>
257:     <xsd:enumeration value="[*]contains ignore case"/>
258:     <xsd:enumeration value="[*]start with ignore case"/>
259:     <xsd:enumeration value="[*]end with ignore case"/>
260:     <xsd:enumeration value="[*]before"/>
261:     <xsd:enumeration value="[*]after"/>
262:   </xsd:restriction>
263: </xsd:simpleType>
264: </xsd:schema>
```

The following is an example using the metadata previously described. If given:

(a>0 && b>0) && (c==1 || c ==2) && e!=0 && (Today is Tuesday)

applying the metadata for the Boolean Network rule engine:

```
 1:  <?xml version="1.0" encoding="UTF-8"?>
 2:  <rulebase>
 3:    <imp>
 4:      <_body>
 5:        <and>
 6:          <atom>
 7:            <_opr>
 8:              <rel>greaterThan</rel>
 9:            </_opr>
10:            <var>a</var>
11:            <ind>0</ind>
12:          </atom>
13:          <atom>
14:            <_opr>
15:              <rel>greaterThan</rel>
16:            </_opr>
17:            <var>b</var>
18:            <ind>0</ind>
19:          </atom>
20:          <or>
21:            <atom>
22:              <_opr>
23:                <rel>equalTo</rel>
24:              </_opr>
25:              <var>c</var>
26:              <ind>1</ind>
27:            </atom>
28:            <atom>
29:              <_opr>
30:                <rel>equalTo</rel>
31:              </_opr>
32:              <var>c</var>
33:              <ind>2</ind>
34:            </atom>
35:          </or>
36:          <atom>
37:            <_opr>
38:              <rel>notEqualTo</rel>
39:            </_opr>
40:            <var>e</var>
41:            <ind>0</ind>
42:          </atom>
43:          <atom>
44:            <_opr>
45:              <rel>is</rel>
46:            </_opr>
47:            <ind>today</ind>
48:            <ind>Tuesday</ind>
49:          </atom>
50:        </and>
51:      </_body>
52:      <_head>
53:        <atom>
54:          <_opr>
55:            <rel></rel>
56:          </_opr>
```

-continued

```
57:         </atom>
58:       </_head>
59:     </imp>
60:   </rulebase>
```

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A system for evaluation of a set of rules based on input data, the system comprising:
   a rules interface for receiving a set of rules from a user, each rule having at least one condition;
   a network builder for building a Boolean Network representation of the set of rules in a computing system, the Boolean Network representation including transducers linked by logic gates, each transducer generating a Boolean value based on evaluating an item of input data against a condition of a rule; wherein said network builder assigns weights to links between transducers and logic gates of the Boolean Network representation for establishing an order in which transducers and logic gates are activated; and
   a runtime evaluation engine for receiving input data, detecting changed items of input data, activating links among transducers and logic gates of the Boolean Network representation based on said changed items of input data so as to utilize transducers and logic gates of the Boolean Network representation relevant to rule evaluation outcome, evaluating rules based on the input data and active transducers and logic gates of the Boolean Network representation, and returning results of evaluation of said set of rules;
   wherein said runtime evaluation engine activates transducers and logic gates for evaluation based on results of evaluation of items of input data and said weights.

2. The system of claim 1, wherein said logic gates of the Boolean Network representation include OR gates.

3. The system of claim 1, wherein said logic gates of the Boolean Network representation include conjunctive logic gates and disjunctive logic gates.

4. The system of claim 1, wherein said rules interface receives rules written in RuleML.

5. The system of claim 1, wherein said rules interface comprises a JSR 94 interface.

6. The system of claim 1, wherein said network builder factors the set of rules for common expressions so as to remove redundancies from the Boolean Network representation.

7. The system of claim 1, wherein said network builder creates groups of related transducers so as to provide for more efficient evaluation of input data.

8. The system of claim 7, wherein said related transducers comprise transducers evaluating a common item of input data.

9. The system of claim 8, wherein said groups of related transducers are grouped based on transducer condition.

10. The system of claim 9, wherein evaluation of one transducer in a group of related transducers enables the runtime evaluation engine to imply a result of evaluation of at least some other related transducers in the group.

11. The system of claim 1, wherein said runtime evaluation engine listens on a first link into an AND logic gate and only activates a second link into the AND logic gate if the Boolean value of TRUE is received through the first link.

12. The system of claim 1, wherein a transducer harvests an input item of data when activated.

13. A system for evaluation of a set of rules based on input data, the system comprising:
   a rules interface for receiving a set of rules from a user, each rule having at least one condition;
   a network builder for building a Boolean Network representation of the set of rules in a computing system, the Boolean Network representation including transducers linked by logic gates, each transducer generating a Boolean value based on evaluating an item of input data against a condition of a rule; and
   a runtime evaluation engine for receiving input data, detecting changed items of input data, activating and passivating links among transducers and logic gates of the Boolean Network representation based on said changed items of input data so as to utilize transducers and logic gates of the Boolean Network representation relevant to rule evaluation outcome, evaluating rules based on the input data and active transducers and logic gates of the Boolean Network representation, and returning results of evaluation of said set of rules; wherein said runtime evaluation engine passivates links based on results of evaluation of items of input data so as to avoid evaluating other items of input data without affect on rule outcome.

14. The system of claim 13, wherein said runtime evaluation engine passivates a first link into an OR logic gate in response to receiving a Boolean value of TRUE through a second link into the OR logic gate.

15. The system of claim 13, wherein said runtime evaluation engine passivates a first link into an AND logic gate in response to receiving a Boolean value of FALSE through a second link into the AND logic gate.

16. The system of claim 13, wherein said runtime evaluation engine propagates a passivation message from a given input link back through logic nodes and transducers in the Boolean Network representation which flow into the given input link.

17. The system of claim 13, wherein a link is passivated when its source node changes from TRUE to FALSE.

18. A method in a computing system for evaluating a set of rules based on input data, the method comprising:
   receiving a set of rules from a user, each rule having at least one condition;
   building a Boolean Network representation of the set of rules in the computing system, the Boolean Network representation including transducers linked by logic gates with each transducer generating a Boolean value based on evaluating an item of input data against a condition of a rule; wherein said building step includes assigning weights
   to links between transducers and logic gates of the Boolean Network representation for establishing an order in which transducers and logic gates are activated;
   detecting changed items of input data;
   in response to changed items of input data, activating links among transducers and logic gates of the Boolean Network representation so as to utilize transducers and logic gates of the Boolean Network representation relevant to rule evaluation outcome; wherein said activating step includes activating transducers and logic gates based on results of evaluation of items of input data and said weights;

determining results of evaluation of the set of rules based on the input data using active transducers and logic gates of the Boolean Network representation; and returning said results of evaluation.

19. The method of claim 18, wherein said logic gates of the Boolean Network representation include OR gates.

20. The method of claim 18, wherein said logic gates of the Boolean Network representation include conjunctive logic gates and disjunctive logic gates.

21. The method of claim 18, wherein said receiving step includes receiving a set of rules written in RuleML.

22. The method of claim 18, wherein said receiving step includes receiving a set of rules through a JSR 94 interface.

23. The method of claim 18, wherein said building step includes factoring the set of rules for common expressions so as to remove redundancies from the Boolean Network representation.

24. The method of claim 18, wherein said building step includes grouping related transducers so as to provide for more efficient evaluation of input data.

25. The method of claim 24, wherein said step of grouping related transducers includes grouping transducers evaluating a common item of input data.

26. The method of claim 25, wherein said grouping of related transducers further comprises grouping related transducers based on conditional operator of said related transducers.

27. The method of claim 26, wherein evaluation of one transducer in a group of related transducers implies a result of evaluation of at least some other related transducers in the group.

28. The method of claim 18, further comprising:
passivating links based on results of evaluation of items of input data so as to avoid evaluating other items of input data without affect on rule outcome.

29. The method of claim 18, wherein said activating step includes listening on a first link into an AND logic gate and activating a second link into the AND logic gate if the Boolean value of TRUE is received through the first link.

30. The method of claim 29, wherein said activating step includes propagating an activation message from the AND logic gate back through logic nodes and transducers in the Boolean Network representation which input into the AND logic gate.

31. The method of claim 18, further comprising:
passivating a first link into an OR logic gate in response to receiving a Boolean value of TRUE through a second link into the OR logic gate.

32. The method of claim 31, wherein said passivating step includes propagating a passivation message from the OR logic gate back through logic nodes and transducers in the Boolean Network representation which input into the OR logic gate.

33. The method of claim 18, further comprising:
passivating a first link into an AND logic gate in response to receiving a Boolean value of FALSE through a second link into the AND logic gate.

34. The method of claim 33, wherein said passivating step includes propagating a passivation message from the AND logic gate back through logic nodes and transducers in the Boolean Network representation which input into the AND logic gate.

35. The method of claim 18, wherein a transducer harvests an input item of data when activated.

36. A computer-readable medium having processor-executable instructions for performing the method of claim 18.

37. The method of claim 18, further comprising:
Downloading a set of processor-executable instructions for performing the method of claim 18.

* * * * *